(12) United States Patent
Wheeler et al.

(10) Patent No.: US 10,841,496 B2
(45) Date of Patent: Nov. 17, 2020

(54) LIDAR TO CAMERA CALIBRATION BASED ON EDGE DETECTION

(71) Applicant: DeepMap Inc., Palo Alto, CA (US)

(72) Inventors: Mark Damon Wheeler, Saratoga, CA (US); Lin Yang, San Carlos, CA (US)

(73) Assignee: DEEPMAP INC., Palo Alto, CA (US)

( * ) Notice: Subject to any disclaimer, the term of this patent is extended or adjusted under 35 U.S.C. 154(b) by 94 days.

(21) Appl. No.: 16/160,926

(22) Filed: Oct. 15, 2018

(65) Prior Publication Data

US 2019/0120947 A1    Apr. 25, 2019

Related U.S. Application Data

(60) Provisional application No. 62/574,744, filed on Oct. 19, 2017.

(51) Int. Cl.
*H04N 5/232*    (2006.01)
*G01S 17/87*    (2020.01)
(Continued)

(52) U.S. Cl.
CPC ....... *H04N 5/2329* (2013.01); *G01C 21/3602* (2013.01); *G01S 7/4817* (2013.01); *G01S 7/497* (2013.01); *G01S 7/4972* (2013.01); *G01S 17/42* (2013.01); *G01S 17/86* (2020.01); *G01S 17/87* (2013.01); *G01S 17/89* (2013.01); *G01S 17/931* (2020.01); *G05D 1/0088* (2013.01); *G05D 1/0231* (2013.01); *G05D 1/0248* (2013.01); *G06T 7/13* (2017.01); *G06T 7/33* (2017.01); *G06T 7/55* (2017.01); *G06T 7/80* (2017.01); *H04N 5/04* (2013.01); *H04N 5/232* (2013.01); *H04N 13/106* (2018.05); *B60R 1/00* (2013.01);
(Continued)

(58) Field of Classification Search
CPC ........ G01S 17/88; G01S 17/931; G01S 17/87; H04N 5/2329
See application file for complete search history.

(56) References Cited

U.S. PATENT DOCUMENTS

2018/0190046 A1* 7/2018 Levinson ............ G05D 1/0272
2018/0192059 A1* 7/2018 Yang .................... G01S 17/86
2019/0011927 A1* 1/2019 Mou ................. G06K 9/00791

OTHER PUBLICATIONS

Eggert, D. W. et al., Estimating 3-D rigid body transformations: a comparison of four major algorithms, Machine Vision and Applications, 1997, pp. 272-290.
(Continued)

*Primary Examiner* — John J Lee
(74) *Attorney, Agent, or Firm* — Maschoff Brennan

(57) ABSTRACT

A system performs calibration of sensors mounted on a vehicle, for example, lidar and camera sensors mounted on a vehicle, for example, an autonomous vehicle. The system receives a lidar scan and camera image of a view and determines a lidar-to-camera transform based on the lidar scan and the camera image. The system may use a pattern, for example, a checkerboard pattern in the view for calibration. The pattern is placed close to the vehicle to determine an approximate lidar-to-camera transform and then placed at a distance from the vehicle to determine an accurate lidar-to-camera transform. Alternatively, the system determines edges in the lidar scan and the camera image and aligns features based on real-world objects in the scene by comparing edges.

20 Claims, 26 Drawing Sheets

(51) Int. Cl.

| | |
|---|---|
| *G01S 17/86* | (2020.01) |
| *G01S 17/931* | (2020.01) |
| *G01S 7/497* | (2006.01) |
| *G01S 17/89* | (2020.01) |
| *G05D 1/02* | (2020.01) |
| *G06T 7/80* | (2017.01) |
| *G06T 7/13* | (2017.01) |
| *G01S 17/42* | (2006.01) |
| *G01S 7/481* | (2006.01) |
| *G05D 1/00* | (2006.01) |
| *G06T 7/55* | (2017.01) |
| *G06T 7/33* | (2017.01) |
| *G01C 21/36* | (2006.01) |
| *H04N 5/04* | (2006.01) |
| *H04N 13/106* | (2018.01) |
| *H04N 5/225* | (2006.01) |
| *H04N 5/247* | (2006.01) |
| *B60R 1/00* | (2006.01) |
| *G06K 9/00* | (2006.01) |
| *G06K 9/62* | (2006.01) |

(52) U.S. Cl.
CPC ... *G05D 1/0287* (2013.01); *G05D 2201/0213* (2013.01); *G06K 9/00791* (2013.01); *G06K 9/6202* (2013.01); *G06T 2207/10028* (2013.01); *G06T 2207/10048* (2013.01); *G06T 2207/20092* (2013.01); *G06T 2207/20221* (2013.01); *G06T 2207/30241* (2013.01); *G06T 2207/30242* (2013.01); *G06T 2207/30252* (2013.01); *H04N 5/2253* (2013.01); *H04N 5/247* (2013.01)

(56) References Cited

OTHER PUBLICATIONS

Levinson, J. et al., "Automatic Online Calibration of Cameras and Lasers," Robotics: Science and Systems, Jun. 24-28, 2013, pp. 1-8.

Levinson, J. et al., "Towards Fully Autonomous Driving: Systems and Algorithms," IEEE Intelligent Vehicles Symposium (IV) 2011, pp. 1-6.

Lorusso, A. et al., "A Comparison of Four Algorithms for Estimating 3-D Rigid Transformations," British Machine Vision Conference, 1995, pp. 237-246.

Park, Y. et al., "Calibration between Color Camera and 3D LIDAR Instruments with a Polygonal Planar Board," Sensors 14, Mar. 17, 2014, pp. 5333-5353.

Pusztai, Z. et al., Accurate Calibration of LiDAR-Camera Systems using Ordinary Boxes, IEEE International Conference on Computer Vision Workshops, Oct. 22-29, 2017, pp. 394-402.

Segal, A. V. et al., "Generalized-ICP," Robotics: Science and Systems, Jun. 2009, pp. 1-8.

Velas, M. et al., "Calibration of RGB Camera With Velodyne LiDAR," 2014, pp. 1-10.

* cited by examiner

LIDAR TO CAMERA CALIBRATION BASED ON EDGE DETECTION

CROSS REFERENCE TO RELATED APPLICATIONS

This application claims the benefit of priority under 35 USC 119(e) to U.S. Provisional Application No. 62/574,744 entitled "Lidar to Camera Calibration for Generating High Definition Maps," filed on Oct. 19, 2017, which is incorporated herein by reference in its entirety for all purposes.

BACKGROUND

This disclosure relates generally to calibration of sensors on vehicles, for example, autonomous vehicles, and more particularly to calibration of lidar and camera sensors of installed on vehicles.

Autonomous vehicles, also known as self-driving cars, driverless cars, auto, or robotic cars, drive from a source location to a destination location without requiring a human driver to control and navigate the vehicle. Automation of driving is difficult due to several reasons. For example, autonomous vehicles use sensors to make driving decisions on the fly, but vehicle sensors cannot observe everything all the time. Vehicle sensors can be obscured by corners, rolling hills, and other vehicles. Vehicles sensors may not observe certain things early enough to make decisions. In addition, lanes and signs may be missing on the road or knocked over or hidden by bushes, and therefore not detectable by sensors. Furthermore, road signs for rights of way may not be readily visible for determining from where vehicles could be coming, or for swerving or moving out of a lane in an emergency or when there is a stopped obstacle that must be passed.

Autonomous vehicles can use map data to figure out some of the above information instead of relying on sensor data. However conventional maps have several drawbacks that make them difficult to use for an autonomous vehicle. For example maps do not provide the level of accuracy required for safe navigation (e.g., 10 cm or less). GPS systems provide accuracies of approximately 3-5 meters, but have large error conditions resulting in an accuracy of over 100 m. This makes it challenging to accurately determine the location of the vehicle.

Autonomous vehicles use various processes for self-driving based on high definition maps generated using data obtained from multiple sensors, for example, lidar and camera sensors. Each sensor of the autonomous vehicle, may use its own coordinate system. For example, the lidar may use one coordinate system and a camera may use another coordinate system. If the coordinate systems used by two different sensors are not calibrated together, any processing that combines data from the two sensors is likely to be inaccurate. Furthermore, the calibration parameters of various sensors of autonomous vehicles drift over time. Conventional techniques require manual processing by experts, thereby requiring autonomous vehicles to be provided to the experts for calibration. Such techniques are time consuming and expensive. Furthermore, these techniques put burden on the users of the vehicles by requiring them to arrive at a specialized facility for calibration or to perform technical steps on their own for performing calibration.

SUMMARY

Embodiments of the invention perform calibration of sensors mounted on a vehicle, for example, lidar and camera sensors mounted on an autonomous vehicle.

A system performs calibration of sensors based on data collected by the sensors. In particular the system performs calibration of a lidar and a camera mounted on a vehicle, for example, an autonomous vehicle. The system receives a lidar scan from the lidar and a camera image from the camera. The system determines a first set of edges based on the lidar scan. The system determines the first set of edges by performing the following steps. The system selects a first set of points based on a difference between intensity of each point and an adjacent point. The system selects a second set of points based on a difference between depth of each point and an adjacent point. The system determines the first set of edges based on the first set of points and the second set of points. The system determines a second set of edges based on the camera image. The system determines a measure of alignment between the first set of edges and the second set of edges based on a first transform. The system determines a second transform based on the first transform. The second transform has a better measure of alignment compared to the first transform. The system uses the second transform to generate a high definition map. The system uses the high definition map for sending signals to the controls of the autonomous vehicle, for example for routing the autonomous vehicle.

Embodiments of the invention allow calibration of sensors of vehicles without requiring extensive manual setup or expert help. As a result, sensors of vehicles can be calibrated on a regular basis. This allows accurate correlation of data obtained by different sensors for combining the data. Since high definition maps are generated by combining data captured by different sensors, embodiments of the invention improve the quality of maps generated as well as efficiency of generation of map.

The features and advantages described in this summary and the following detailed description are not all-inclusive. Many additional features and advantages will be apparent to one of ordinary skill in the art in view of the drawings, specification, and claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure (FIG. 1 shows the overall system environment of an HD map system interacting with multiple vehicle computing systems, according to an embodiment.

Figure 1:
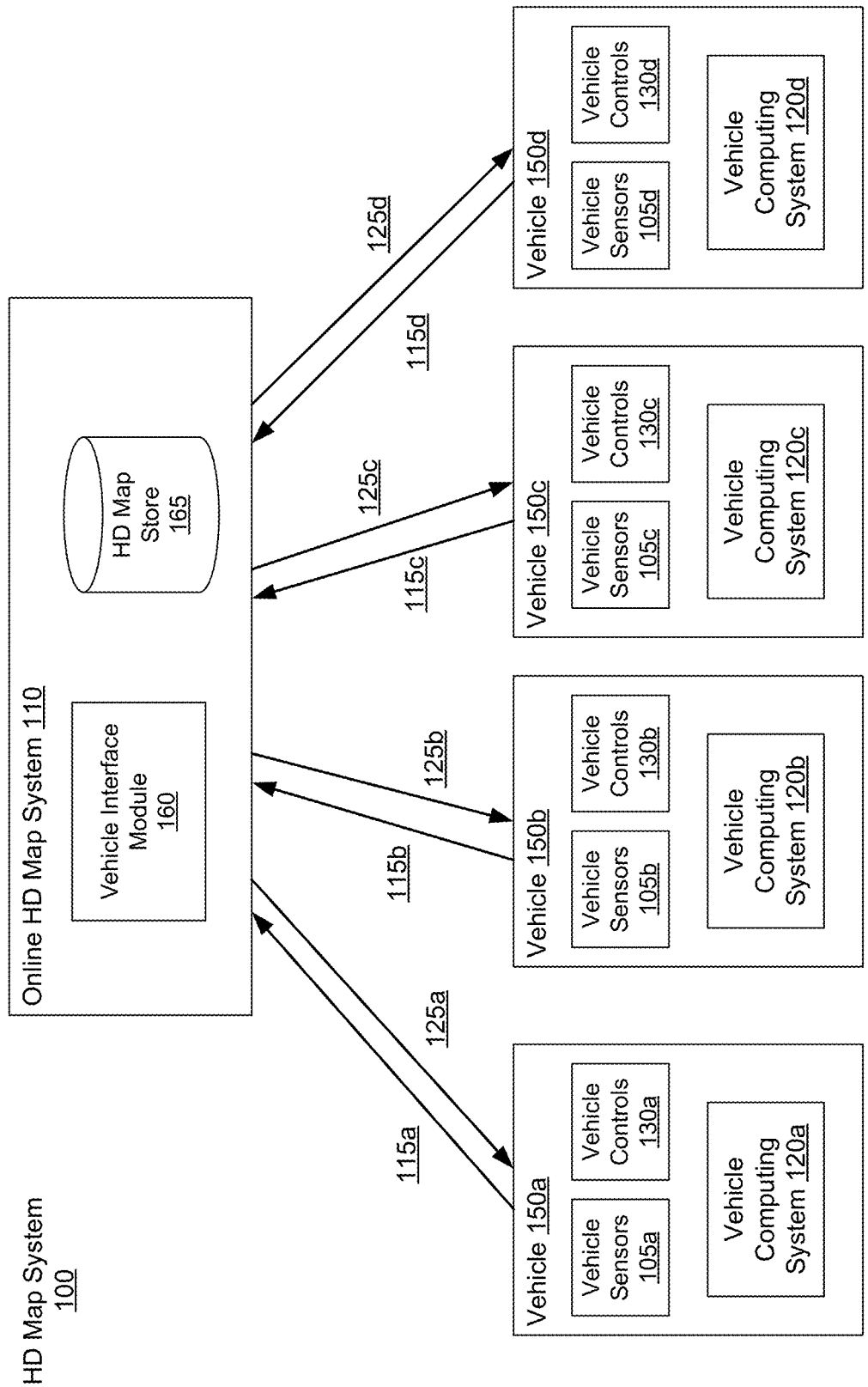

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments of the invention maintain high definition (HD) maps containing up to date information using high precision. The HD maps may be used by autonomous vehicles to safely navigate to their destinations without human input or with limited human input. An autonomous vehicle is a vehicle capable of sensing its environment and navigating without human input. Autonomous vehicles may also be referred to herein as "driverless car," "self-driving car," or "robotic car." An HD map refers to a map storing data with very high precision, typically 5-10 cm. Embodiments generate HD maps containing spatial geometric information about the roads on which an autonomous vehicle can travel. Accordingly, the generated HD maps include the information necessary for an autonomous vehicle navigating safely without human intervention. Instead of collecting data for the HD maps using an expensive and time consuming mapping fleet process including vehicles outfitted with high resolution sensors, embodiments of the invention use data from the lower resolution sensors of the self-driving vehicles themselves as they drive around through their environments. The vehicles may have no prior map data for these routes or even for the region. Embodiments of the invention provide location as a service (LaaS) such that autonomous vehicles of different manufacturers can each have access to the most up-to-date map information created via these embodiments of invention.

Embodiments of the invention perform lidar-to-camera calibration for use in generating and maintaining high definition (HD) maps that are accurate and include the most updated road conditions for safe navigation. For example, the HD maps provide the current location of the autonomous vehicle relative to the lanes of the road precisely enough to allow the autonomous vehicle to drive safely in the lane.

HD maps store a very large amount of information, and therefore face challenges in managing the information. For example, an HD map for a large geographic region may not fit on the local storage of a vehicle. Embodiments of the invention provide the necessary portion of an HD map to an autonomous vehicle that allows the vehicle to determine its current location in the HD map, determine the features on the road relative to the vehicle's position, determine if it is safe to move the vehicle based on physical constraints and legal constraints, etc. Examples of physical constraints include physical obstacles, such as walls, and examples of legal constraints include legally allowed direction of travel for a lane, speed limits, yields, stops.

Embodiments of the invention allow safe navigation for an autonomous vehicle by providing high latency, for example, 10-20 milliseconds or less for providing a response to a request; high accuracy in terms of location, i.e., accuracy within 10 cm or less; freshness of data by ensuring that the map is updated to reflect changes on the road within a reasonable time frame; and storage efficiency by minimizing the storage needed for the HD Map.

FIG. 1 shows the overall system environment of an HD map system interacting with multiple vehicles, according to an embodiment. The HD map system 100 includes an online HD map system 110 that interacts with a plurality of vehicles 150. The vehicles 150 may be autonomous vehicles but are not required to be. The online HD map system 110 receives sensor data captured by sensors of the vehicles, and combines the data received from the vehicles 150 to generate and maintain HD maps. The online HD map system 110 sends HD map data to the vehicles for use in driving the vehicles. In an embodiment, the online HD map system 110 is implemented as a distributed computing system, for example, a cloud based service that allows clients such as vehicle computing systems 120 to make requests for information and services. For example, a vehicle computing system 120 may make a request for HD map data for driving along a route and the online HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
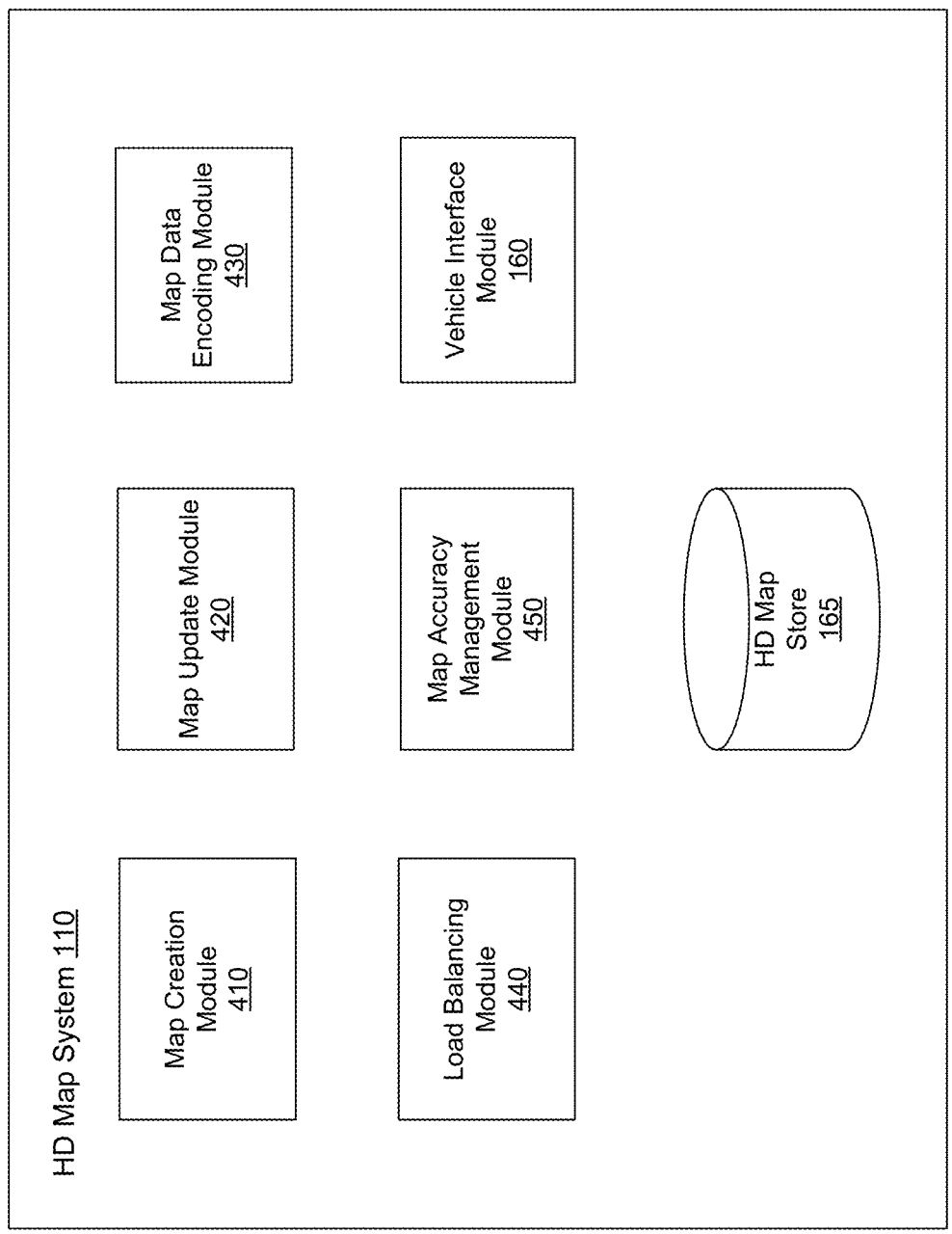
FIG. 4 shows the system architecture of an HD map system, according to an embodiment.

The online HD map system 110 comprises a vehicle interface module 160 and an HD map store 165. The online HD map system 110 interacts with the vehicle computing system 120 of various vehicles 150 using the vehicle interface module 160. The online HD map system 110 stores map information for various geographical regions in the HD map store 165. The online HD map system 110 may include other modules than those shown in FIG. 1, for example, various other modules as illustrated in FIG. 4 and further described herein.

The online HD map system 110 receives 115 data collected by sensors of a plurality of vehicles 150, for example, hundreds or thousands of cars. The vehicles provide sensor data captured while driving along various routes and send it to the online HD map system 110. The online HD map system 110 uses the data received from the vehicles 150 to create and update HD maps describing the regions in which the vehicles 150 are driving. The online HD map system 110 builds high definition maps based on the collective information received from the vehicles 150 and stores the HD map information in the HD map store 165.

The online HD map system 110 sends 125 HD maps to individual vehicles 150 as required by the vehicles 150. For example, if an autonomous vehicle needs to drive along a route, the vehicle computing system 120 of the autonomous vehicle provides information describing the route being travelled to the online HD map system 110. In response, the online HD map system 110 provides the required HD maps for driving along the route.

In an embodiment, the online HD map system 110 sends portions of the HD map data to the vehicles in a compressed format so that the data transmitted consumes less bandwidth. The online HD map system 110 receives from various vehicles, information describing the data that is stored at the local HD map store 275 of the vehicle. If the online HD map system 110 determines that the vehicle does not have certain portion of the HD map stored locally in the local HD map store 275, the online HD map system 110 sends that portion of the HD map to the vehicle. If the online HD map system 110 determines that the vehicle did previously receive that particular portion of the HD map but the corresponding data was updated by the online HD map system 110 since the vehicle last received the data, the online HD map system 110 sends an update for that portion of the HD map stored at the vehicle. This allows the online HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. The vehicle sensors 105 comprise a camera, a light detection and ranging sensor (LIDAR), a global positioning system (GPS) navigation system, an inertial measurement unit (IMU), and others. The vehicle has one or more cameras that capture images of the surroundings of the vehicle. A LIDAR surveys the surroundings of the vehicle by measuring distance to a target by illuminating that target with a laser light pulses, and measuring the reflected pulses. The GPS navigation system determines the position of the vehicle based on signals from satellites. An IMU is an electronic device that measures and reports motion data of the vehicle such as velocity, acceleration, direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

The vehicle computing system 120 performs various tasks including processing data collected by the sensors as well as map data received from the online HD map system 110. The vehicle computing system 120 also processes data for sending to the online HD map system 110. Details of the vehicle computing system are illustrated in FIG. 2 and further described in connection with FIG. 2.

The interactions between the vehicle computing systems 120 and the online HD map system 110 are typically performed via a network, for example, via the Internet. The network enables communications between the vehicle computing systems 120 and the online HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
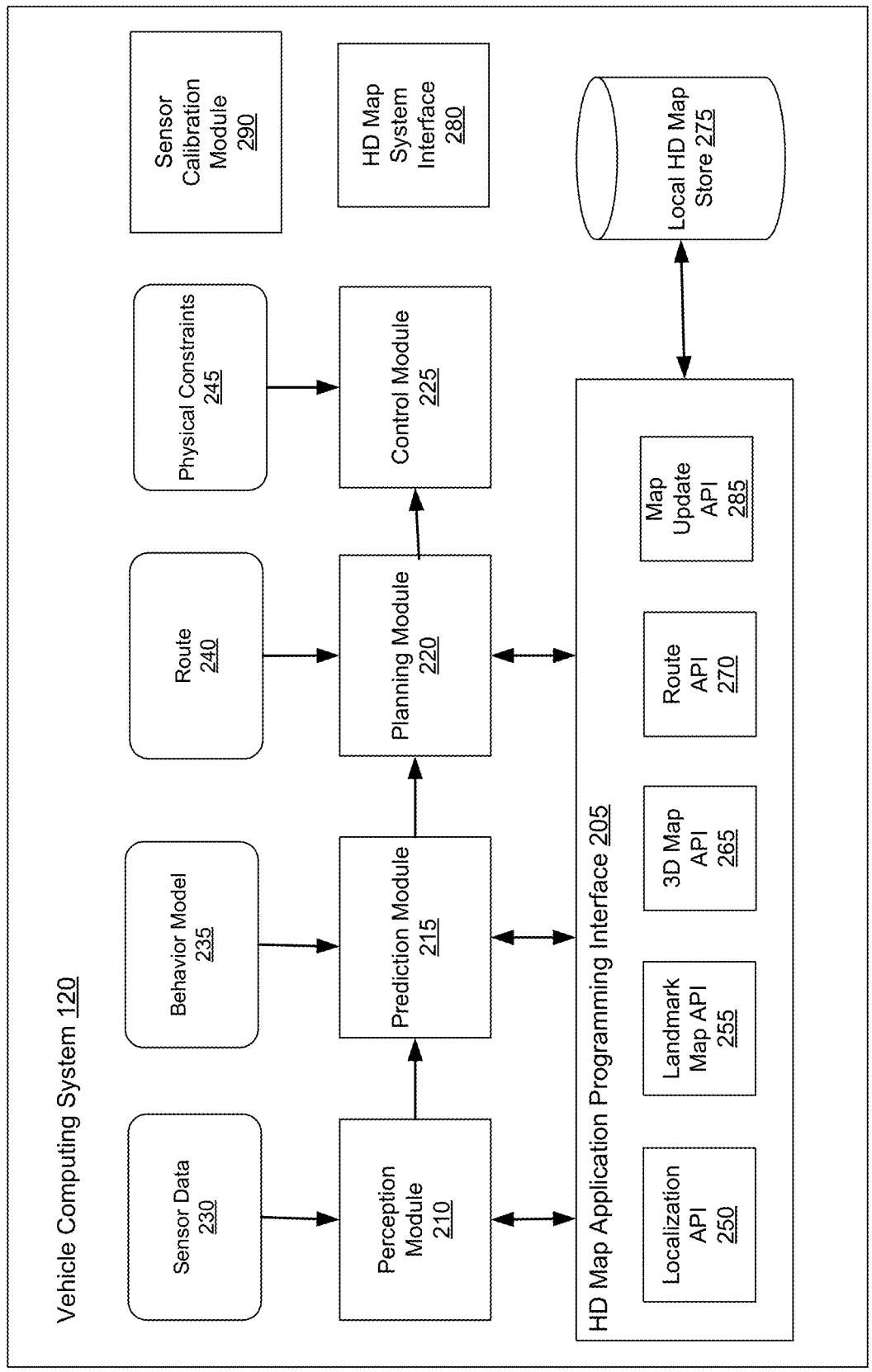
FIG. 2 shows the system architecture of a vehicle computing system, according to an embodiment.

FIG. 2 shows the system architecture of a vehicle computing system, according to an embodiment. The vehicle computing system 120 comprises a perception module 210, prediction module 215, planning module 220, a control module 225, a local HD map store 275, an HD map system interface 280, an HD map application programming interface (API) 205, and a calibration module 290. The various modules of the vehicle computing system 120 process various type of data including sensor data 230, a behavior model 235, routes 240, and physical constraints 245. In other embodiments, the vehicle computing system 120 may have more or fewer modules. Functionality described as being implemented by a particular module may be implemented by other modules. Some of the modules may execute in the online HD map system 110. For example, the calibration module 290 may execute in the online HD map system 110.

The perception module 210 receives sensor data 230 from the sensors 105 of the vehicle 150. This includes data collected by cameras of the car, LIDAR, IMU, GPS navigation system, and so on. The perception module 210 uses the sensor data to determine what objects are around the vehicle, the details of the road on which the vehicle is travelling, and so on. The perception module 210 processes the sensor data 230 to populate data structures storing the sensor data and provides the information to the prediction module 215.

The prediction module 215 interprets the data provided by the perception module using behavior models of the objects perceived to determine whether an object is moving or likely to move. For example, the prediction module 215 may determine that objects representing road signs are not likely to move, whereas objects identified as vehicles, people, and so on, are either moving or likely to move. The prediction module 215 uses the behavior models 235 of various types of objects to determine whether they are likely to move. The prediction module 215 provides the predictions of various objects to the planning module 200 to plan the subsequent actions that the vehicle needs to take next.

The planning module 200 receives the information describing the surroundings of the vehicle from the prediction module 215, the route 240 that determines the destination of the vehicle, and the path that the vehicle should take to get to the destination. The planning module 200 uses the information from the prediction module 215 and the route 240 to plan a sequence of actions that the vehicle needs to take within a short time interval, for example, within the next few seconds. In an embodiment, the planning module 200 specifies the sequence of actions as one or more points representing nearby locations that the vehicle needs to drive through next. The planning module 200 provides the details of the plan comprising the sequence of actions to be taken by the vehicle to the control module 225. The plan may determine the subsequent action of the vehicle, for example, whether the vehicle performs a lane change, a turn, acceleration by increasing the speed or slowing down, and so on.

The control module 225 determines the control signals for sending to the controls 130 of the vehicle based on the plan received from the planning module 200. For example, if the vehicle is currently at point A and the plan specifies that the vehicle should next go to a nearby point B, the control module 225 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly.

The control module 225 also receives physical constraints 245 as input. These include the physical capabilities of that specific vehicle. For example, a car having a particular make and model may be able to safely make certain types of vehicle movements such as acceleration, and turns that another car with a different make and model may not be able to make safely. The control module 225 incorporates these physical constraints in determining the control signals. The control module 225 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The various modules of the vehicle computing system 120 including the perception module 210, prediction module 215, and planning module 220 receive map information to perform their respective computation. The vehicle 150 stores the HD map data in the local HD map store 275. The modules of the vehicle computing system 120 interact with the map data using the HD map API 205 that provides a set of application programming interfaces (APIs) that can be invoked by a module for accessing the map information. The HD map system interface 280 allows the vehicle computing system 120 to interact with the online HD map system 110 via a network (not shown in the Figures). The local HD map store 275 stores map data in a format specified by the HD Map system 110. The HD map API 205 is capable of processing the map data format as provided by the HD Map system 110. The HD Map API 205 provides the vehicle computing system 120 with an interface for interacting with the HD map data. The HD map API 205 includes several APIs including the localization API 250, the landmark map API 255, the route API 265, the 3D map API 270, the map update API 285, and so on.

The localization APIs 250 determine the current location of the vehicle, for example, when the vehicle starts and as the vehicle moves along a route. The localization APIs 250 include a localize API that determines an accurate location of the vehicle within the HD Map. The vehicle computing system 120 can use the location as an accurate relative positioning for making other queries, for example, feature queries, navigable space queries, and occupancy map queries further described herein. The localize API receives inputs comprising one or more of, location provided by GPS, vehicle motion data provided by IMU, LIDAR scanner data, and camera images. The localize API returns an accurate location of the vehicle as latitude and longitude coordinates. The coordinates returned by the localize API are more accurate compared to the GPS coordinates used as input, for example, the output of the localize API may have precision range from 5-10 cm. In one embodiment, the vehicle computing system 120 invokes the localize API to determine location of the vehicle periodically based on the LIDAR using scanner data, for example, at a frequency of 10 Hz. The vehicle computing system 120 may invoke the localize API to determine the vehicle location at a higher rate (e.g., 60 Hz) if GPS/IMU data is available at that rate. The vehicle computing system 120 stores as internal state, location history records to improve accuracy of subsequent localize calls. The location history record stores history of location from the point-in-time, when the car was turned off/stopped. The localization APIs 250 include a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 255 provides the geometric and semantic description of the world around the vehicle, for example, description of various portions of lanes that the vehicle is currently travelling on. The landmark map APIs 255 comprise APIs that allow queries based on landmark maps, for example, fetch-lanes API and fetch-features API. The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify a distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 265 provides efficient access to the spatial 3-dimensional (3D) representation of the road and various physical objects around the road as stored in the local HD map store 275. The 3D map APIs 365 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary.

The 3D map APIs also include map update APIs, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the online HD map system 110. This allows the online HD map system 110 to keep the HD map data stored in the online HD map system 110 up to date based on changes in map data observed by sensors of vehicles driving along various routes.

The route API 270 returns route information including full route between a source and destination and portions of route as the vehicle travels along the route. The 3D map API 365 allows querying the HD Map. The route APIs 270 include add-planned-routes API and get-planned-route API. The add-planned-routes API provides information describing planned routes to the online HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its TTL value, and makes sure that the HD map data for the route stored in the vehicle computing system 120 is up to date. The get-planned-routes API returns a list of planned routes and provides information describing a route identified by a route identifier.

The map update API 285 manages operations related to update of map data, both for the local HD map store 275 and for the HD map store 165 stored in the online HD map system 110. Accordingly, modules in the vehicle computing system 120 invoke the map update API 285 for downloading data from the online HD map system 110 to the vehicle computing system 120 for storing in the local HD map store 275 as necessary. The map update API 285 also allows the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

The calibration module 290 performs various actions related to calibration of sensors of an autonomous vehicle, for example, lidar-to-camera calibration or lidar-to-lidar calibration. Lidar and cameras of an autonomous vehicle record data in their own coordinate systems. In an embodiment, the HD map system 100 determines a rigid 3d transform (a rotation+translation) to convert data from a coordinate system to another. In some embodiment, the HD map system 100 uses perspective-n-point techniques for determining a transform from one coordinate system to another. Tools and modules of HD map system 100 that use both data sources require accurate lidar-to-camera calibration, for example, OMap coloring, feature projection, camera-based localization, demo viewer, and so on. In an embodiment, the autonomous vehicle is equipped with one lidar and two cameras (stereo). The different sensors have a shard field of view. In an embodiment, the cameras have been calibrated individually.

FIG. 4 illustrates the various layers of instructions in the HD Map API of a vehicle computing system, according to an embodiment. Different manufacturer of vehicles have different instructions for receiving information from vehicle sensors 105 and for controlling the vehicle controls 130. Furthermore, different vendors provide different compute platforms with autonomous driving capabilities, for example, collection and analysis of vehicle sensor data. Examples of compute platform for autonomous vehicles include platforms provided vendors, such as NVIDIA, QUALCOMM, and INTEL. These platforms provide functionality for use by autonomous vehicle manufacturers in manufacture of autonomous vehicles. A vehicle manufacturer can use any one or several compute platforms for autonomous vehicles. The online HD map system 110 provides a library for processing HD maps based on instructions specific to the manufacturer of the vehicle and instructions specific to a vendor specific platform of the vehicle. The library provides access to the HD map data and allows the vehicle to interact with the online HD map system 110.

Figure 3:
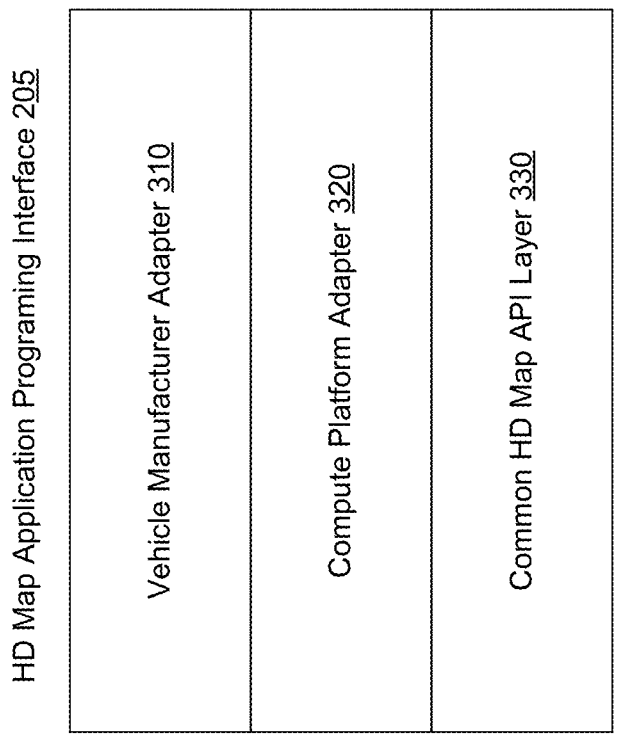
FIG. 3 illustrates the various layers of instructions in the HD Map API of a vehicle computing system, according to an embodiment.

As shown in FIG. 3, in an embodiment, the HD map API is implemented as a library that includes a vehicle manufacturer adapter 310, a compute platform adapter 320, and a common HD map API layer 330. The common HD map API layer comprises generic instructions that can be used across a plurality of vehicle compute platforms and vehicle manufacturers. The compute platform adapter 320 include instructions that are specific to each computer platform. For example, the common HD Map API layer 330 may invoke the compute platform adapter 320 to receive data from sensors supported by a specific compute platform. The vehicle manufacturer adapter 310 comprises instructions specific to a vehicle manufacturer. For example, the common HD map API layer 330 may invoke functionality provided by the vehicle manufacturer adapter 310 to send specific control instructions to the vehicle controls 130.

The online HD map system 110 stores compute platform adapters 320 for a plurality of compute platforms and vehicle manufacturer adapters 310 for a plurality of vehicle manufacturers. The online HD map system 110 determines the particular vehicle manufacturer and the particular compute platform for a specific autonomous vehicle. The online HD map system 110 selects the vehicle manufacturer adapter 310 for the particular vehicle manufacturer and the compute platform adapter 320 the particular compute platform of that specific vehicle. The online HD map system 110 sends instructions of the selected vehicle manufacturer adapter 310 and the selected compute platform adapter 320 to the vehicle computing system 120 of that specific autonomous vehicle. The vehicle computing system 120 of that specific autonomous vehicle installs the received vehicle manufacturer adapter 310 and the compute platform adapter 320. The vehicle computing system 120 periodically checks if the online HD map system 110 has an update to the installed vehicle manufacturer adapter 310 and the compute platform adapter 320. If a more recent update is available compared to the version installed on the vehicle, the vehicle computing system 120 requests and receives the latest update and installs it.

HD Map System Architecture

FIG. 4 shows the system architecture of an HD map system, according to an embodiment. The online HD map system 110 comprises a map creation module 410, a map update module 420, a map data encoding module 430, a load balancing module 440, a map accuracy management module, a vehicle interface module, and a HD map store 165. Other embodiments of online HD map system 110 may include more or fewer modules than shown in FIG. 4. Functionality indicated as being performed by a particular module may be implemented by other modules. In an embodiment, the online HD map system 110 may be a distributed system comprising a plurality of processors.

The map creation module 410 creates the map from map data collected from several vehicles that are driving along various routes. The map update module 420 updates previously computed map data by receiving more recent information from vehicles that recently travelled along routes on which map information changed. For example, if certain road signs have changed or lane information has changed as a result of construction in a region, the map update module 420 updates the maps accordingly. The map data encoding module 430 encodes map data to be able to store the data efficiently as well as send the required map data to vehicles 150 efficiently. The load balancing module 440 balances load across vehicles to ensure that requests to receive data from vehicles are uniformly distributed across different vehicles. The map accuracy management module 450 maintains high accuracy of the map data using various techniques even though the information received from individual vehicles may not have high accuracy.

Figure 5:
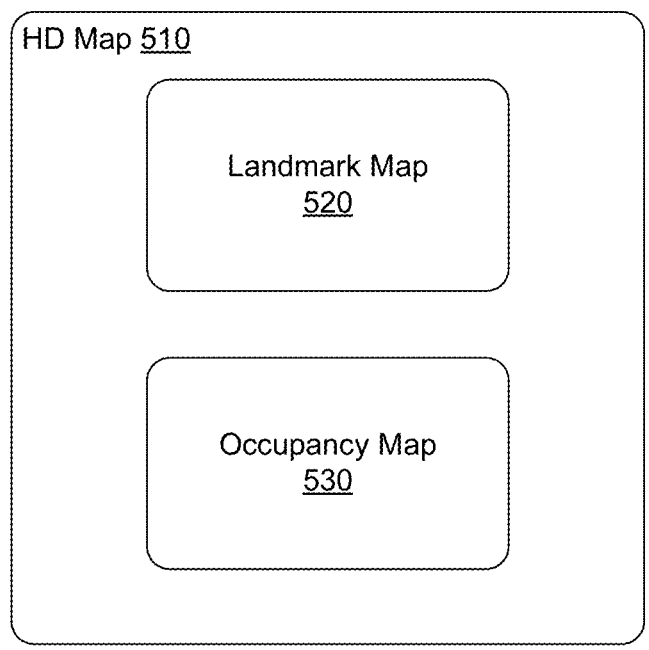
FIG. 5 illustrates the components of an HD map, according to an embodiment.

FIG. 5 illustrates the components of an HD map, according to an embodiment. The HD map comprises maps of several geographical regions. The HD map 510 of a geographical region comprises a landmark map (LMap) 520 and an occupancy map (OMap) 530. The landmark map comprises information describing lanes including spatial location of lanes and semantic information about each lane. The spatial location of a lane comprises the geometric location in latitude, longitude and elevation at high prevision, for example, at or below 10 cm precision. The semantic information of a lane comprises restrictions such as direction, speed, type of lane (for example, a lane for going straight, a left turn lane, a right turn lane, an exit lane, and the like), restriction on crossing to the left, connectivity to other lanes and so on. The landmark map may further comprise information describing stop lines, yield lines, spatial location of cross walks, safely navigable space, spatial location of speed bumps, curb, and road signs comprising spatial location and type of all signage that is relevant to driving restrictions. Examples of road signs described in an HD map include stop signs, traffic lights, speed limits, one-way, do-not-enter, yield (vehicle, pedestrian, animal), and so on.

The occupancy map 530 comprises spatial 3-dimensional (3D) representation of the road and all physical objects around the road. The data stored in an occupancy map 530 is also referred to herein as occupancy grid data. The 3D representation may be associated with a confidence score indicative of a likelihood of the object existing at the location. The occupancy map 530 may be represented in a number of other ways. In one embodiment, the occupancy map 530 is represented as a 3D mesh geometry (collection of triangles) which covers the surfaces. In another embodiment, the occupancy map 530 is represented as a collection of 3D points which cover the surfaces. In another embodiment, the occupancy map 530 is represented using a 3D volumetric grid of cells at 5-10 cm resolution. Each cell indicates whether or not a surface exists at that cell, and if the surface exists, a direction along which the surface is oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore the online HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD Map does not require or rely on data typically included in maps, such as addresses, road names, ability to geo-code an address, and ability to compute routes between place names or addresses. The vehicle computing system 120 or the online HD map system 110 accesses other map systems, for example, GOOGLE MAPs to obtain this information. Accordingly, a vehicle computing system 120 or the online HD map system 110 receives navigation instructions from a tool such as GOOGLE MAPs into a route and converts the information to a route based on the HD map information.

Geographical Regions in HD Maps

The online HD map system 110 divides a large physical area into geographical regions and stores a representation of each geographical region. Each geographical region represents a contiguous area bounded by a geometric shape, for example, a rectangle or square. In an embodiment, the online HD map system 110 divides a physical area into geographical regions of the same size independent of the amount of data required to store the representation of each geographical region. In another embodiment, the online HD map system 110 divides a physical area into geographical regions of different sizes, where the size of each geographical region is determined based on the amount of information needed for representing the geographical region. For example, a geographical region representing a densely populated area with a large number of streets represents a smaller physical area compared to a geographical region representing sparsely populated area with very few streets. Accordingly, in this embodiment, the online HD map system 110 determines the size of a geographical region based on an estimate of an amount of information required to store the various elements of the physical area relevant for an HD map.

In an embodiment, the online HD map system 110 represents a geographic region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 6A:
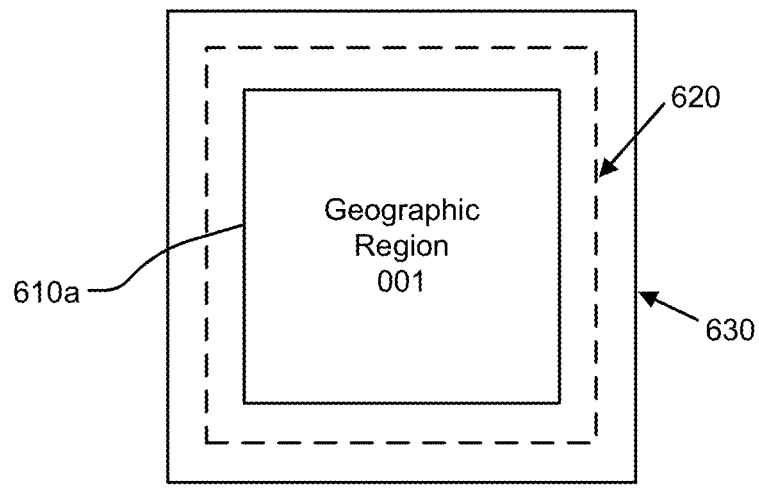
FIGS. 6A-B illustrate geographical regions defined in an HD map, according to an embodiment.
Figure 6B:
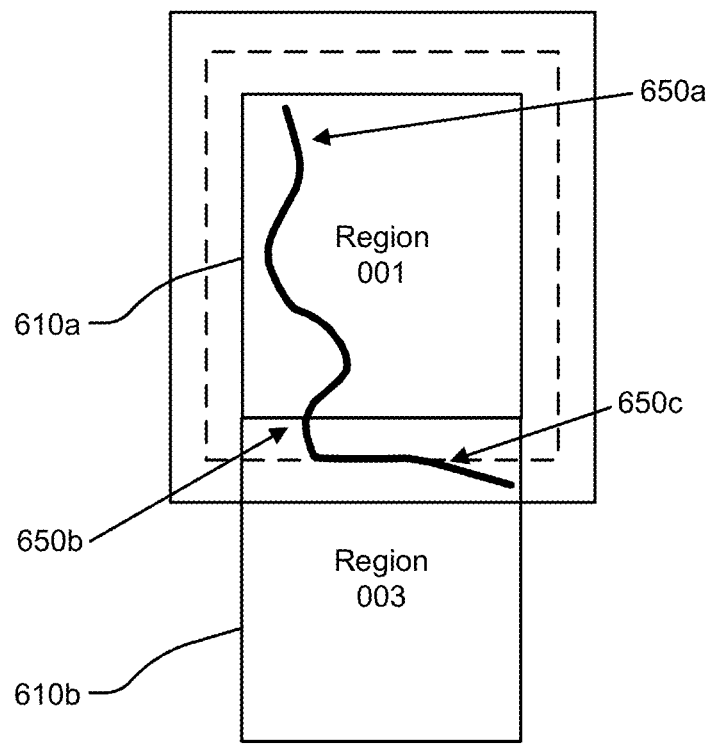

FIGS. 6A-B illustrate geographical regions defined in an HD map, according to an embodiment. FIG. 6A shows a square geographical region 610a. FIG. 6B shows two neighboring geographical regions 610a and 610b. The online HD map system 110 stores data in a representation of a geographical region that allows for smooth transition from one geographical region to another as a vehicle drives across geographical region boundaries.

According to an embodiment, as illustrated in FIG. 6, each geographic region has a buffer of a predetermined width around it. The buffer comprises redundant map data around all 4 sides of a geographic region (in the case that the geographic region is bounded by a rectangle). FIG. 6A shows a boundary 620 for a buffer of 50 meters around the geographic region 610a and a boundary 630 for buffer of 100 meters around the geographic region 610a. The vehicle computing system 120 switches the current geographical region of a vehicle from one geographical region to the neighboring geographical region when the vehicle crosses a threshold distance within this buffer. For example, as shown in FIG. 6B, a vehicle starts at location 650a in the geographical region 610a. The vehicle traverses along a route to reach a location 650b where it cross the boundary of the geographical region 610 but stays within the boundary 620 of the buffer. Accordingly, the vehicle computing system 120 continues to use the geographical region 610a as the current geographical region of the vehicle. Once the vehicle crosses the boundary 620 of the buffer at location 650c, the vehicle computing system 120 switches the current geographical region of the vehicle to geographical region 610b from 610a. The use of a buffer prevents rapid switching of the current geographical region of a vehicle as a result of the vehicle travelling along a route that closely tracks a boundary of a geographical region.

Lane Representations in HD Maps

The HD map system 100 represents lane information of streets in HD maps. Although the embodiments described herein refer to streets, the techniques are applicable to highways, alleys, avenues, boulevards, or any other path on which vehicles can travel. The HD map system 100 uses lanes as a reference frame for purposes of routing and for localization of a vehicle. The lanes represented by the HD map system 100 include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map system 100 also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane. Accordingly, the HD map system 100 stores a representation of a network of lanes to allow a vehicle to plan a legal path between a source and a destination and to add a frame of reference for real time sensing and control of the vehicle. The HD map system 100 stores information and provides APIs that allow a vehicle to determine the lane that the vehicle is currently in, the precise vehicle location relative to the lane geometry, and all relevant features/data relative to the lane and adjoining and connected lanes.

Figure 7:
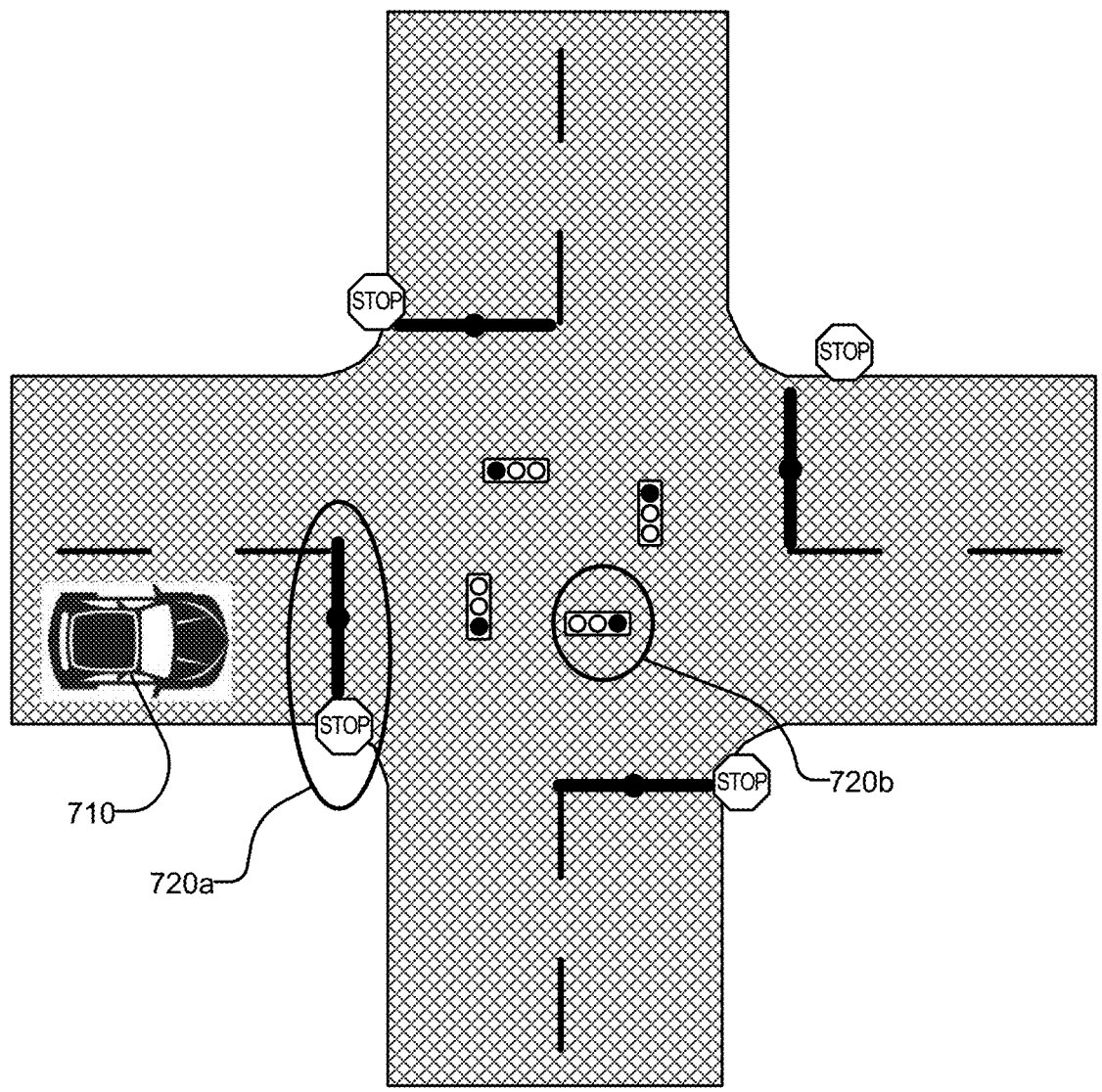
FIG. 7 illustrates representations of lanes in an HD map, according to an embodiment.

FIG. 7 illustrates lane representations in an HD map, according to an embodiment. FIG. 7 shows a vehicle 710 at a traffic intersection. The HD map system provides the vehicle with access to the map data that is relevant for autonomous driving of the vehicle. This includes, for example, features 720a and 720b that are associated with the lane but may not be the closest features to the vehicle. Therefore, the HD map system 100 stores a lane-centric representation of data that represents the relationship of the lane to the feature so that the vehicle can efficiently extract the features given a lane.

The HD map system 100 represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 100 represents a lane element as a continuous geometric portion of a single vehicle lane. The HD map system 100 stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

Examples of lane elements represented by the HD map system 100 include, a piece of a right lane on a freeway, a piece of a lane on a road, a left turn lane, the turn from a left turn lane into another lane, a merge lane from an on-ramp an exit lane on an off-ramp, and a driveway. The HD map system 100 represents a one lane road using two lane elements, one for each direction. The HD map system 100 represents median turn lanes that are shared similar to a one-lane road.

Figure 8A:
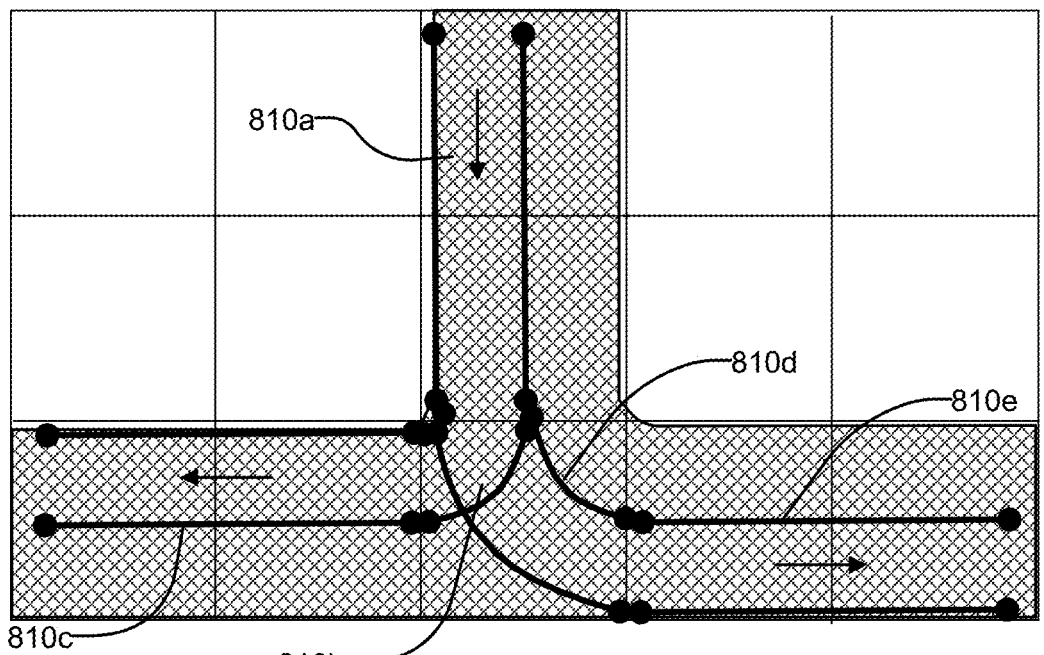
FIGS. 8A-B illustrates lane elements and relations between lane elements in an HD map, according to an embodiment.
Figure 8B:
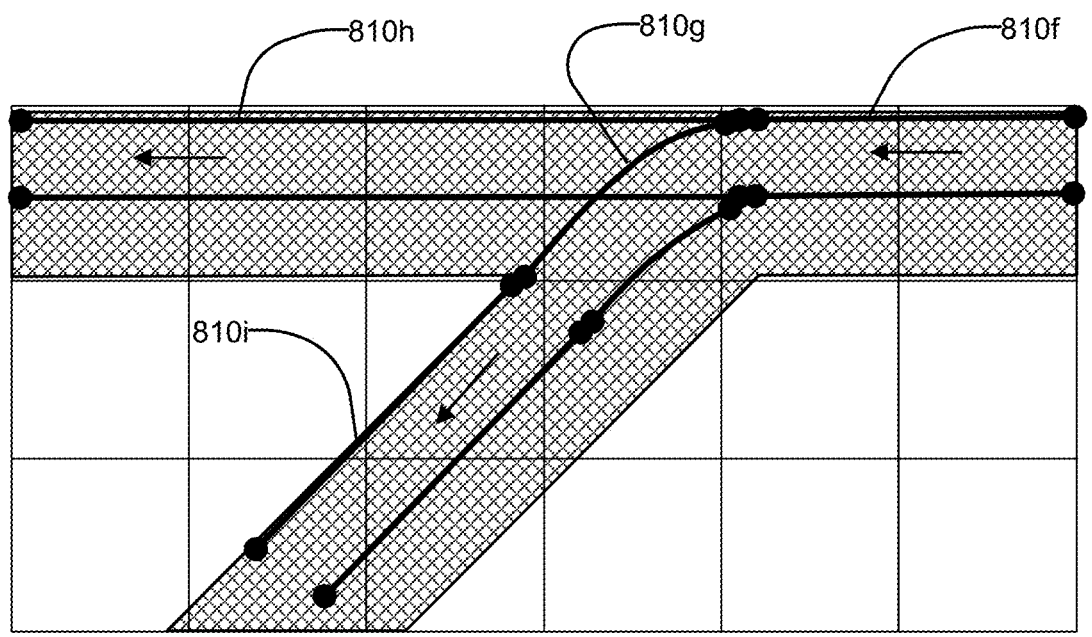

FIGS. 8A-B illustrates lane elements and relations between lane elements in an HD map, according to an embodiment. FIG. 8A shows an example of a T junction in a road illustrating a lane element 810a that is connected to lane element 810c via a turn lane 810b and is connected to lane 810e via a turn lane 810d. FIG. 8B shows an example of a Y junction in a road showing label 810f connected to lane 810h directly and connected to lane 810i via lane 810g. The HD map system 100 determines a route from a source location to a destination location as a sequence of connected lane elements that can be traversed to reach from the source location to the destination location.

Lidar-to-camera Calibration

Figure 9:
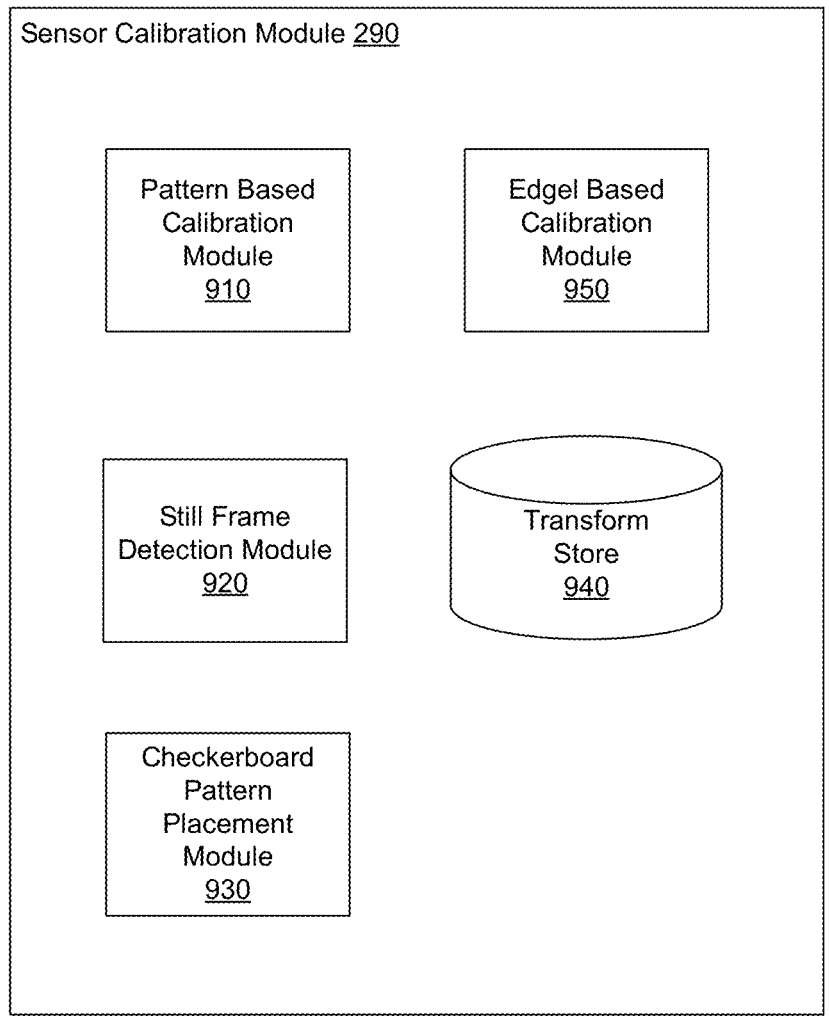
FIG. 9 illustrates the system architecture of a sensor calibration module, according to an embodiment.

FIG. 9 illustrates the system architecture of a sensor calibration module, according to an embodiment. The sensor calibration module comprises various modules including pattern based calibration module 910, still frame detection module 920, a checkerboard pattern placement module 930, edgel based calibration module 950, and transform store 940. Other embodiments may include more of fewer modules. The modules described herein may be stored and executed in the vehicle computing system, in the online HD map system, or both. Steps described as being performed by a particular module may be performed by other modules than those indicated herein. The pattern based calibration module performs calibration based on a pattern, for example, checkerboard pattern that is captured by sensors of the vehicle. The still frame detection module 920 detects still frames from a video for use in calibration. The edgel based calibration module 950 performs edgel based calibration as described in FIGS. 21, 22, and 23. The transform store 940 stores values of various transforms that are determined by the HD map system. The transforms are used by other modules, for example, for HD map generation. The checkerboard pattern placement module 930 helps with placement of checkerboard pattern, for example, by executing the process illustrated in FIG. 20.

According to some embodiments, the HD map system receives sensor data of scenes including a checkerboard pattern and uses the sensor data for performing calibration. The checkerboard pattern may be placed at various locations in front of the vehicle by a user. The vehicle may capture a video comprising images including the checkerboard pattern. The HD map system extracts sensor data from frames of the video and analyzes the sensor data to perform calibration.

Figure 10A:
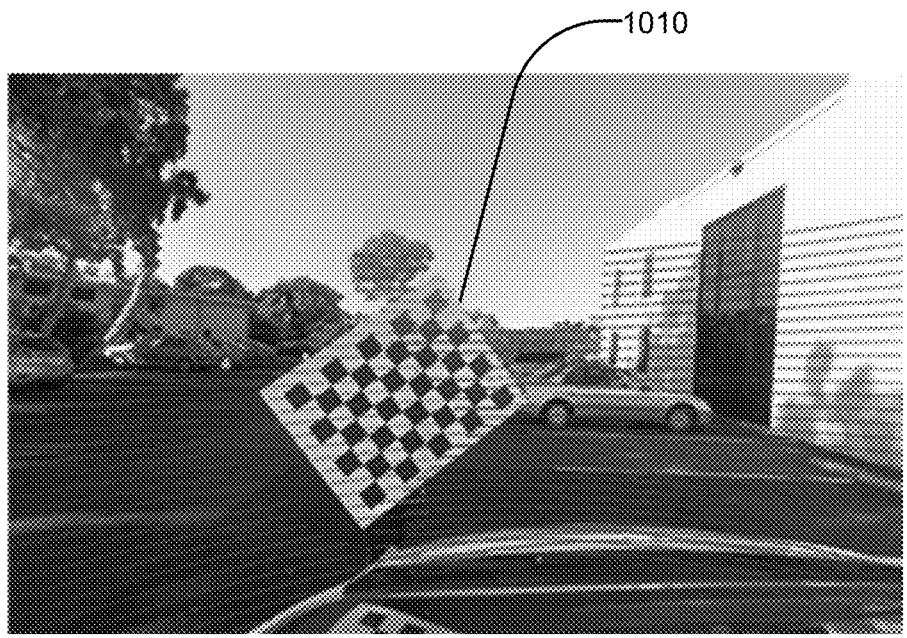
FIG. 10(A) illustrates sensor data obtained from a scene comprising a checkerboard pattern held in front of a vehicle, according to an embodiment.

FIG. 10(A) illustrates sensor data obtained from a scene comprising a checkerboard pattern 1010 held in front of a vehicle, according to an embodiment. The checkerboard pattern is kept in front of the vehicle sensors including the lidar and camera. A lidar scan of the scene showing the checkerboard pattern is captured by the vehicle lidar and images of the s of the checkerboard pattern are captured using the vehicle cameras. The lidar scans and camera images are used for calibrating the vehicle sensors.

Figure 10B:
FIG. 10(B) illustrates sensor data obtained from a scene comprising a pattern including different colored tapes, for example, alternating red and blue tapes, according to an embodiment.

The pattern used for calibration is not limited to a checkerboard pattern and can be other types of patterns, for example, alternating stripes. FIG. 10(B) illustrates sensor data obtained from a scene comprising a pattern 1020 including different colored tapes, for example, alternating red and blue tapes, according to an embodiment. The HD map system analyzes the sensor data to detect edges in the pattern and uses the information for calibration of sensors.

A user places the pattern at various distances and locations so as to cover different areas visible from sensors of the vehicle. In an embodiment, the HD map system captures the sensor data including these patterns and determines a set of 3d-to-2d correspondences between lidar points and image pixels. The HD map system converts the information of the 3d-to-2d correspondences to a perspective-n-point (PnP) problem and solves the problem, for example, using Levenberg-Marquardt technique. The HD map system detects 2d checkerboard corners from camera images, with subpixel accuracy.

The perspective-n-point (PnP) problem is the problem of estimating the pose of a calibrated camera given a set of N 3D points in the world and their corresponding 2D projections in the image. The camera pose is represented using 6 degrees-of-freedom (DOF) comprising the rotation (roll, pitch, and yaw) and 3D translation of the camera with respect to the world. For example, techniques for solving the perspective-n-point problem for N=3 are called P3P, and other techniques are used for solving the perspective-n-point problem for N≥3. Accordingly, techniques for solving the perspective-n-point problem are referred to herein as perspective-n-point techniques.

A perspective-n-point technique receives input comprising a set of N 3D points in a reference frame and their corresponding 2D image projections as well as the calibrated intrinsic camera parameters, and determines the 6 DOF pose of the camera in the form of its rotation and translation with respect to the world. Given a pose of the camera, the perspective-n-point technique can be used to determine the calibrated intrinsic camera parameters and therefore used for performing calibration of the camera. The parameters of the camera that are calibrated include intrinsic properties of the camera such as the focal length, principal image point, skew parameter, and other parameters. If the perspective-n-point technique determines multiple solutions, the HD map system selects a particular solution by performing post-processing of the solution set. The HD map system may use RANSAC with a PnP technique to make the solution robust to outliers in the set of point correspondences.

The HD map system detects corners of the pattern from lidar points. Detecting corners from lidar points is challenging for various reasons. Lidar points are a lot sparser compared to image pixels. Typically lidar points are 0.2 degree apart on the same scan line, and greater than one degree apart across scan lines. Furthermore, lidar points are noisy in both range and intensity values. Range values have a 1-sigma error of 2 cm and the checkerboard point cloud has a 5 cm thickness. Intensity values have a large variation across scan lines. There can be ghost points near physical boundaries. There can be missing points near intensity boundaries. All these issues with lidar points make it difficult to detect 3d corners from lidar points. Techniques disclosed herein determine the corners of the pattern with high accuracy.

The HD map system may have multiple vehicles running on a daily basis for data collection or demo purposes, and there may be a large fleet. Calibration parameters drift over time. Therefore, every car needs to be re-calibrated periodically. Manual calibration that involves an expert can be expensive since the vehicle must be brought to a facility operated by experts. Embodiments provide a predefined calibration procedure that guarantees successful calibration without intervention by a human expert. The procedure uses objects that are portable so that remote users that are not experts can calibrate their cars. The proposed embodiments require a checkerboard and a fairly simple procedure which can be automated.

When the checkerboard is close, for example, within 4 meters, the checkerboard points form a dominant plane within a small radius around the lidar, because there are very few other objects within this radius. The sensor calibration module 290 determines this dominant plane. When the checkerboard is farther away, however, the environment can be full of other planar objects, for example, walls, cabinets, the side of other cars. The checkerboard is typically smaller compared to these objects. As a result, extracting the not-so-big checkerboard is difficult without any prior knowledge of where it is.

Overall Process of Lidar-to-Camera Calibration

Although the processes described herein use a checkerboard pattern for illustrative purposes, the embodiments are not limited to use of checkerboard pattern and can be used with other patterns, for example, striped pattern. Also the processes are described in the context of autonomous vehicles but are not limited to autonomous vehicle and can be applied to other vehicles that may not be autonomous, robots, or any other device that mounts multiple sensors that can drift over time.

Figure 11:
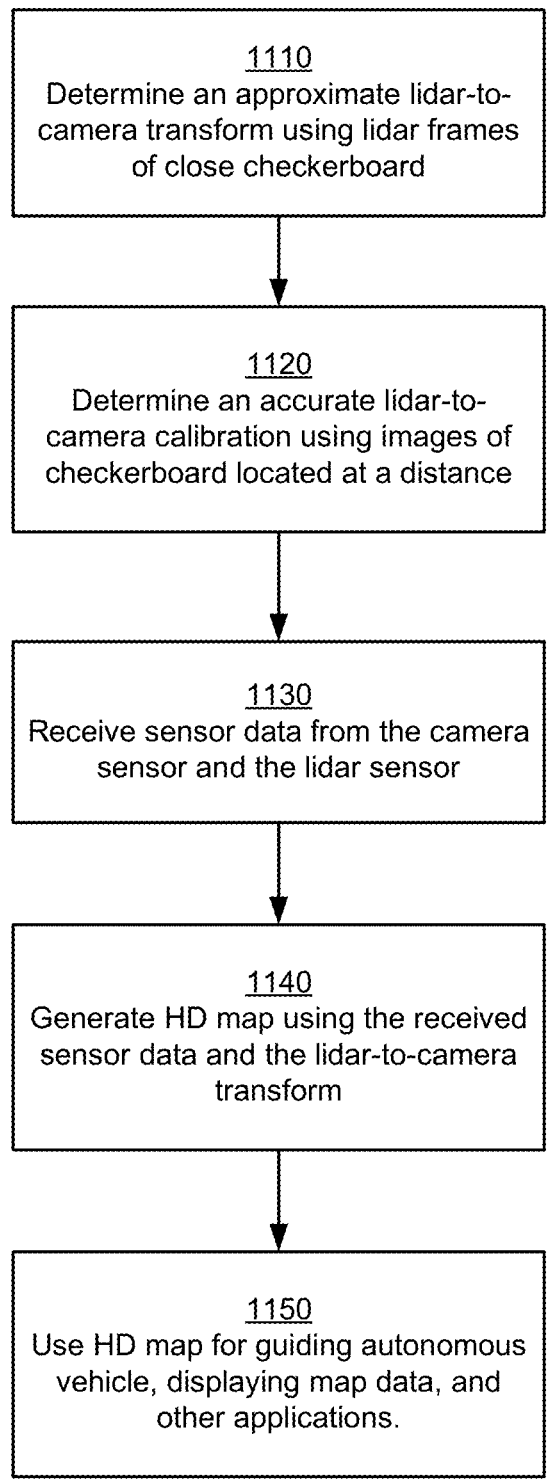
FIG. 11 shows a flowchart illustrating the overall process of lidar-to-camera calibration, according to an embodiment.

FIG. 11 shows a flowchart illustrating the overall process of lidar-to-camera calibration according to an embodiment. The sensor calibration module 290 extracts and refines checkerboard corners using points on the board. The sensor calibration module 290 uses robustness estimators (RANSAC) where possible to minimize the impact of noise.

The sensor calibration module 290 determines 1110 an approximate lidar-to-camera transform using lidar frames of a pattern that is close to the vehicle sensors. This step represents the first pass of the process. For example, the checkerboard pattern is held in front of sensors of the vehicle within a threshold distance. As a result, at least more than a threshold amount of scene captured by the sensors comprises the checkerboard pattern.

The sensor calibration module 290 uses the approximate lidar-to-camera transform to determine 1120 an accurate lidar-to-camera transform using images of checkerboard located at a distance. This step represents the second pass of the process. Accordingly, the checkerboard pattern is held more than a threshold distance from the sensors of the vehicle such that there can be multiple other objects in the scene besides the checkerboard.

Subsequently, the HD map system receives 1130 sensor data from sensors of the vehicle including the camera sensor and lidar sensor, for example, data captured as the vehicle drives along various routes. The HD map system generates 1140 HD maps using the received sensor data and the lidar-to-camera transforms determined by calibrating the sensors of the vehicle. For example, the lidar-to-camera transform is used for correlating the data captured by lidar and camera sensors and combining the data to obtain a consistent view of the surroundings of the vehicle. The vehicle uses 1150 the HD map for various purposes including guiding the vehicle, displaying map data and other applications related to driving of the vehicle or self-driving.

Figure 12:
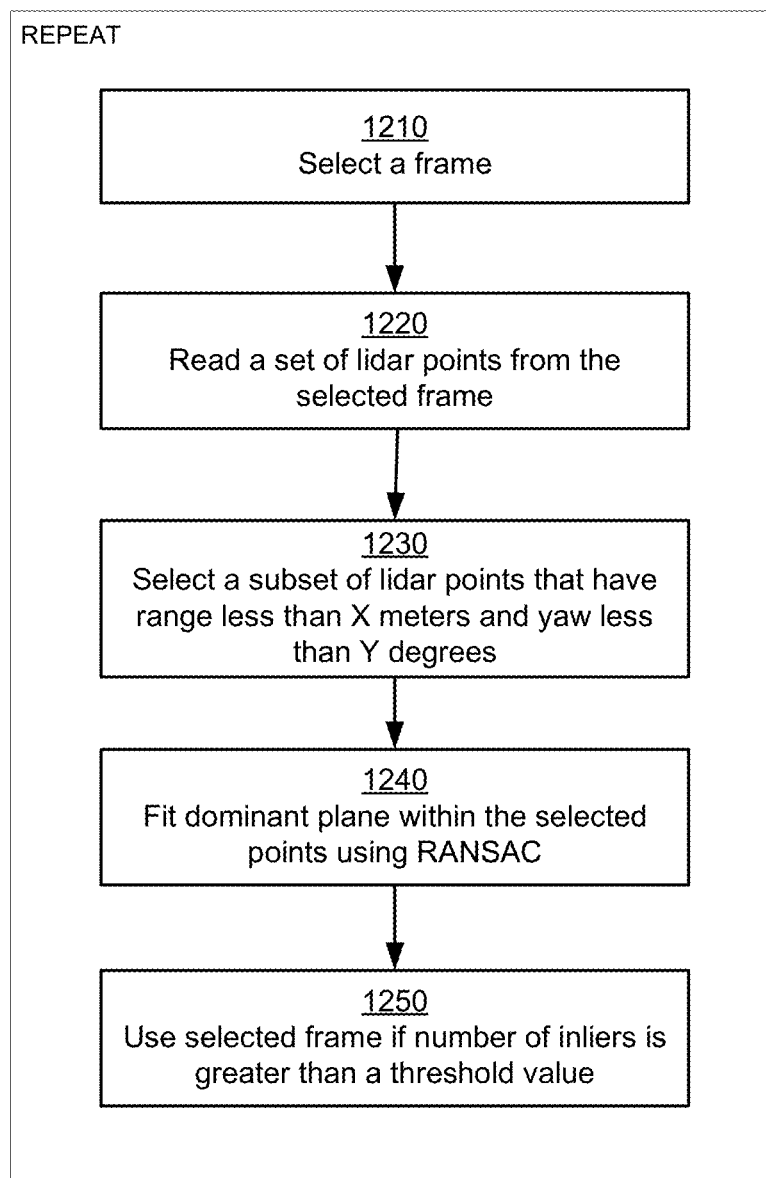
FIG. 12 shows a flowchart illustrating the process of the first phase of lidar-to-camera calibration based on a close view of the checkerboard, according to an embodiment.

Following are the details of step 1110 for determining the approximate lidar-to-camera transform based on close-up views of the checkerboard pattern. FIG. 12 shows a flowchart illustrating the process of the first phase of lidar-to-camera calibration based on a close view of the checkerboard, according to an embodiment. The sensors of the autonomous vehicles obtain a video with the checkerboard located within the field of view of the sensors at a close distance, for example, within a few meters of the autonomous vehicle. In the first pass, the sensor calibration module 290 processes the frames in which the checkerboard is close using a simple plane fitting method. The sensor calibration module 290 determines whether the checkerboard is close. If the sensor calibration module 290 fails to locate the checkerboard in a frame, the sensor calibration module 290 skips the frame and processes the next frame.

As shown in the flowchart illustrated in FIG. 12, the sensor calibration module 290 selects 1210 a frame from the captured video. The sensor calibration module 290 reads 1220 a set of lidar points from the selected frame. The sensor calibration module 290 selects a subset of lidar points that are close to the sensor. For example, the sensor calibration module 290 selects 1230 a subset of the lidar points that have a range less than a threshold distance, for example, less than 4 meters and yaw less than a threshold angle, for example, less than 60 degrees of camera facing direction. The sensor calibration module 290 fits 1240 a dominant plane within the selected points, for example, using techniques such as random sample consensus (RANSAC). The sensor calibration module 290 uses 1250 the selected frame if number of inliers is greater than a threshold value, otherwise the sensor calibration module 290 skips the frame and repeats the above steps by selecting 1210 another frame. The sensor calibration module 290 uses the selected frame to determine corners of the checkerboard pattern.

After the first pass, the sensor calibration module 290 has determined all the 3d points representing corners of the checkerboard pattern near the lidar and determines a rough lidar-to-camera transform by solving the PnP problem. In the second pass, the sensor calibration module 290 processes all the frames again, but this time uses sensor data comprising the checkerboard pattern at various distances including a distances greater than a threshold value. The sensor calibration module 290 triangulates the 2d checkerboard corners detected from left and right camera views, and uses the rough lidar-to-camera transform computed during the first pass to estimate where the corners are in lidar coordinates. The sensor calibration module 290 only keeps lidar points within a small radius of the estimated location. In an embodiment, the sensor calibration module 290 uses a value of the radius that is slightly larger than the half length of the checkerboard. The sensor calibration module 290 ensures that among the remaining points, a majority of them should be on the checkerboard. The sensor calibration module 290 again resorts to a plane fitting method to fit a plane through the points determined to represent the checkerboard. The steps of the process corresponding to the second phase are as follows.

Figure 13:
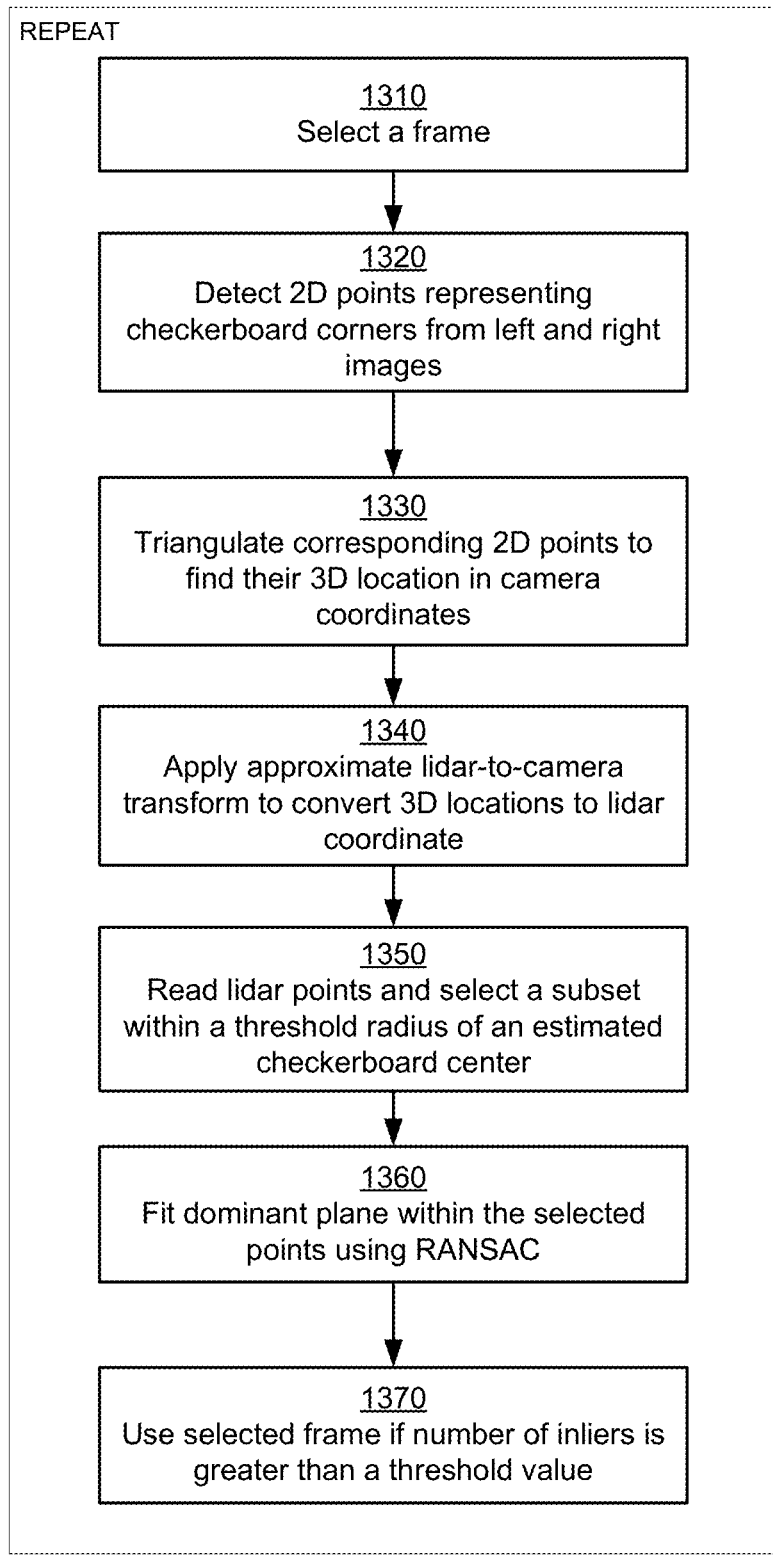
FIG. 13 shows a flowchart illustrating the process of the second phase of lidar-to-camera calibration that determines an accurate lidar-to-camera transform based on a distant view of the checkerboard, according to an embodiment.

FIG. 13 shows a flowchart illustrating the process of the second phase of lidar-to-camera calibration that determines an accurate lidar-to-camera transform based on a distant view of the checkerboard, according to an embodiment. The sensors of the autonomous vehicles capture a video with the checkerboard positioned at more than a threshold distance while in the field of view of the sensors. In an embodiment, the sensors of the autonomous camera include a left camera, a right camera, and a lidar.

The sensor calibration module 290 selects 1310 a frame from the video. The sensor calibration module 290 detects 1320 2D points representing checkerboard corners from left and right camera images. The sensor calibration module 290 triangulates 1330 corresponding 2D points to find their 3D location in camera coordinates. The sensor calibration module 290 applies 1340 approximate lidar-to-camera transform to convert 3D points to lidar coordinates. The sensor calibration module 290 reads 1350 lidar points and selects a subset within a threshold radius of an estimated checkerboard center. The sensor calibration module 290 fits 1360 dominant plane within the selected points using RANSAC. The sensor calibration module 290 uses 1370 the selected frame if number of inliers is greater than a threshold value, for example 100 inliers. Otherwise the sensor calibration module 290 selects 1310 another frame and repeats the above steps.

Figure 14:
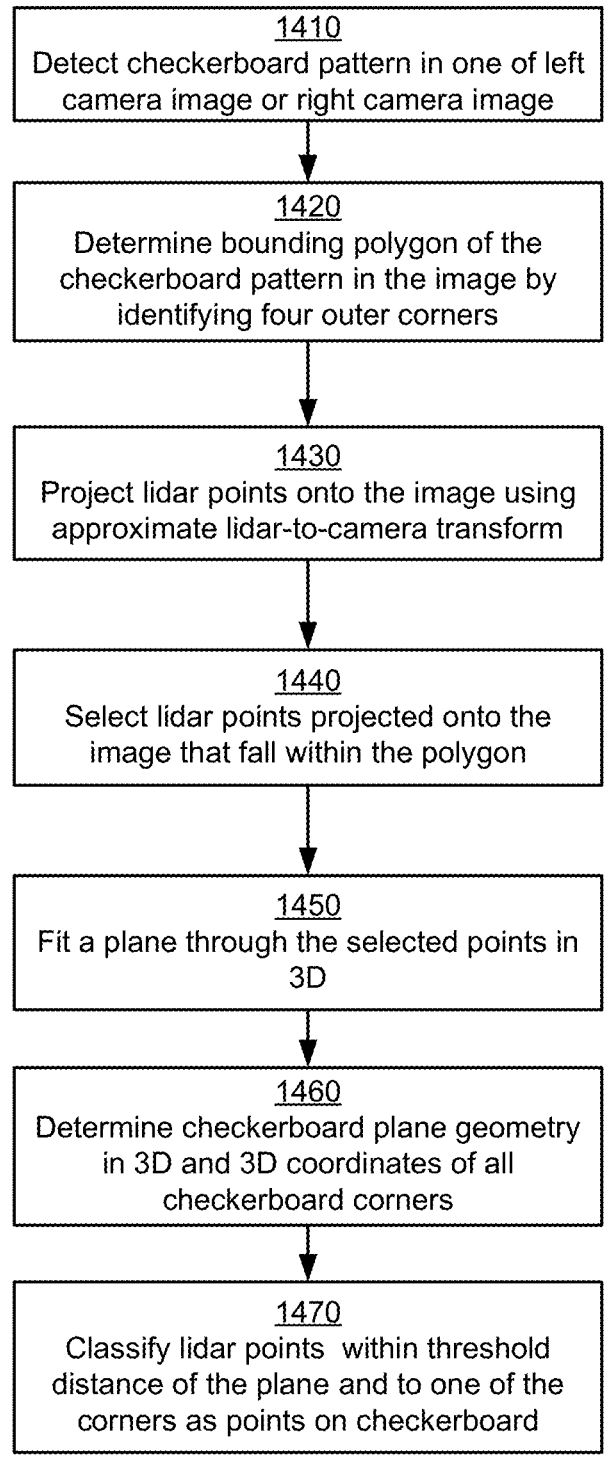
FIG. 14 shows a flowchart illustrating a process for detecting the checkerboard pattern based on a use of a single camera, according to an embodiment.

The process illustrated in FIG. 13 is based on use of two cameras of the autonomous vehicle. FIG. 14 shows a flowchart illustrating a process for detecting the checkerboard pattern based on a use of a single camera, according to an embodiment. Instead of using stereo triangulation, the embodiment uses lidar-assisted plane fitting. Accordingly, the HD map system performs the calibration even if the checkerboard pattern is detected in the view of only one of the cameras. The sensor calibration module 290 selects a frame and analyzes the frame to detect 1410 the checkerboard pattern in at least one of the left camera image or the right camera image. If the sensor calibration module 290 detects the checkerboard pattern in both views, i.e., left camera view and right camera view, the sensor calibration module 290 selects any one view, for example, the left view. If the sensor calibration module 290 fails to detect the checkerboard pattern in either view, the sensor calibration module 290 skips that particular frame and selects another frame of the video. With the checkerboard pattern detected in one view, the sensor calibration module 290 determines 1420 the bounding polygon of the checkerboard pattern by identifying its four outer corners in the frame. Then the sensor calibration module 290 projects 1430 lidar points onto the image using an approximate lidar-to-camera transform, for example, the lidar-to-camera transform determined by the process illustrated in FIG. 13. The sensor calibration module 290 selects 1440 the lidar points projected onto the image that fall inside the polygon area. The sensor calibration module 290 fits 1450 a plane using the collected points in 3d. The sensor calibration module 290 determines 1460 the checkerboard plane geometry in 3d and also determines the 3d coordinates of all the checkerboard corners. The sensor calibration module 290 classifies 1470 all the lidar points, considering the ones within threshold distance to the plane (for example, a small distance of 10 cm) and within threshold distance of one of the corners (for example, a small distance of 20 cm) to be on the checkerboard.

Based on the computations performed by the HD map system as illustrated in FIGS. 11, 12, 13, and 14 above, the HD map system obtains a set of candidate points on the checkerboard. The HD map system next fits the boundary and normal on the checkerboard. Assuming the checkerboard is held angled (as required by the calibration procedure), the system executes the steps illustrated in FIG. 15.

Figure 15:
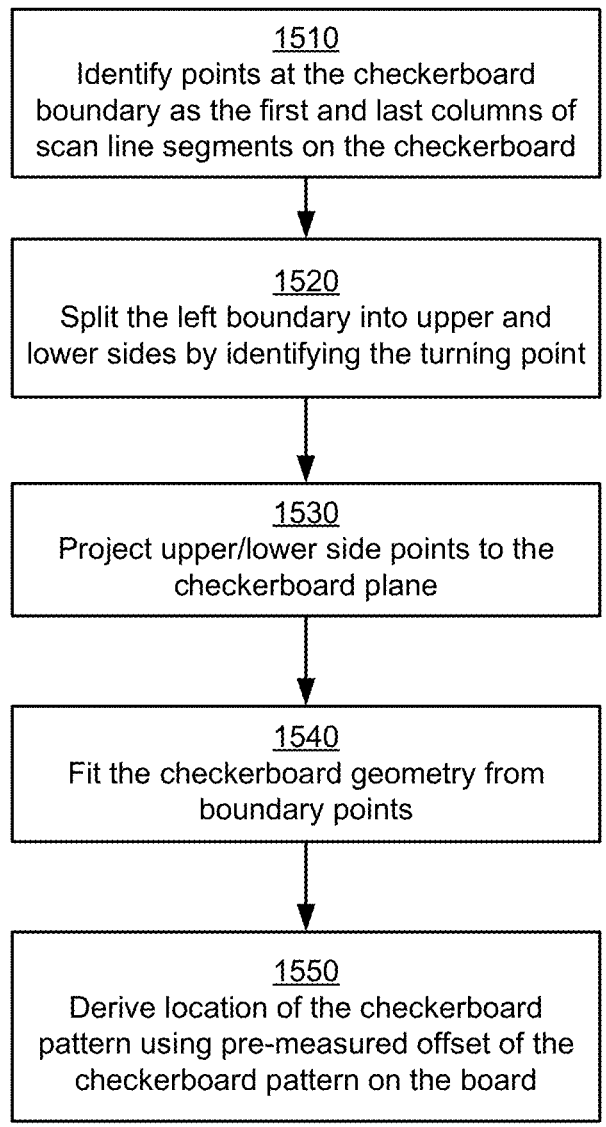
FIG. 15 shows a flowchart illustrating the process of fitting boundary points and a normal on the checkerboard, according to an embodiment.

FIG. 15 shows a flowchart illustrating the process of fitting boundary points and a normal on the checkerboard, according to an embodiment.

The sensor calibration module 290 identifies 1510 points at the checkerboard boundary as the first and last columns of scan line segments on the checkerboard. In an embodiment, the sensor calibration module 290 processes two adjacent sides, for example, only the left side of the boundary including both upper and lower sides for checkerboard fitting purpose. The following discussion describes the method in relation to processing the upper left and lower left boundaries of the checkerboard pattern but can be performed for any two adjacent sides, for example, upper left and upper right side, lower left and lower right sides, and so on. The sensor calibration module 290 identifies ghost points near checkerboard boundary, especially on the left side. If a lidar is scanning from left to right, the laser goes from far away to nearby points at the left side boundary. The sensor calibration module 290 may ignore such a first column. Instead, the sensor calibration module 290 picks the first column that has a neighbor to its right. The sensor calibration module 290 identifies ghost points as points that usually occur a little distance (about 5 cm) away from true boundary that are followed by a gap of 4-5 missing columns. Notice that this may not always be accurate, as sometimes the true boundary can also fall somewhere else within the gap. However, the sensor calibration module 290 uses this step is to compute a rough geometry of the checkerboard, and refine it using intensity data. Accordingly, the sensor calibration module 290 is able to tolerate an error of a few centimeters.

The sensor calibration module 290 splits 1520 the left boundary into upper and lower sides by identifying the turning point corresponding to the left most corner of the checkerboard pattern. These sides correspond to two sides of the checkerboard. The sensor calibration module 290 identifies the turning point as having the minimum x (to the left). The sensor calibration module 290 classifies the points above the turning point as the upper side, and points below the turning point as the lower side. The sensor calibration module 290 may discard the turning point itself, since it can be considered as belonging to either side.

The sensor calibration module 290 projects 1530 the upper/lower side points to the checkerboard plane. This is so because the boundary points are usually noisy in range, as half of the laser beam may hit some background object far away, causing its range to be interpolated. The sensor calibration module 290 projects 1530 the upper/lower side points to the checkerboard plane to eliminate such errors.

The sensor calibration module 290 fits 1540 the checkerboard geometry from boundary points. In an embodiment, the sensor calibration module 290 fits two perpendicular lines that best fit the upper side and lower side boundary points. The sensor calibration module 290 marks the two lines as the X and Y axes of the checkerboard, and their intersection as the origin.

In order to handle noise in the data while enforcing the fitted lines to be always perpendicular, the sensor calibration module 290 uses a RANSAC algorithm, for example, the following 3-point RANSAC algorithm. During each iteration, the sensor calibration module 290 performs the following steps: (a.) Randomly select 2 points from the upper side, for example, point A and point B (b.) Randomly select 1 point from the lower side, for example, point C (c.) Fit y axis using points A, B (d.) Project point C to the y axis to obtain point D, and mark the point D as the origin (e.) Fit x axis using points C and D, and (f.) Count the number of inliers, i.e., boundary points close to the fitted x and y axes.

The sensor calibration module 290 derives 1550 the location of the checkerboard pattern using pre-measured offset of the checkerboard pattern on the board including the corners of the checkerboard pattern.

Refining Checkerboard Pattern Using Intensity Data

The checkerboard corners fitted as shown in FIGS. 11-15 may contain a small amount of error, for example, due to ghost points, missing points, and noise in range values. The sensor calibration module 290 uses the intensity value associated to each lidar point to refine the location of checkerboard corners. For each lidar point, its intensity value (for example, a value in the range of [0, 255]) measures the reflectivity of the object, with 0 being black, absorbent diffuse reflector, 100 being white, reflective diffuse reflector, and 255 being complete retro-reflector.

Figure 16:
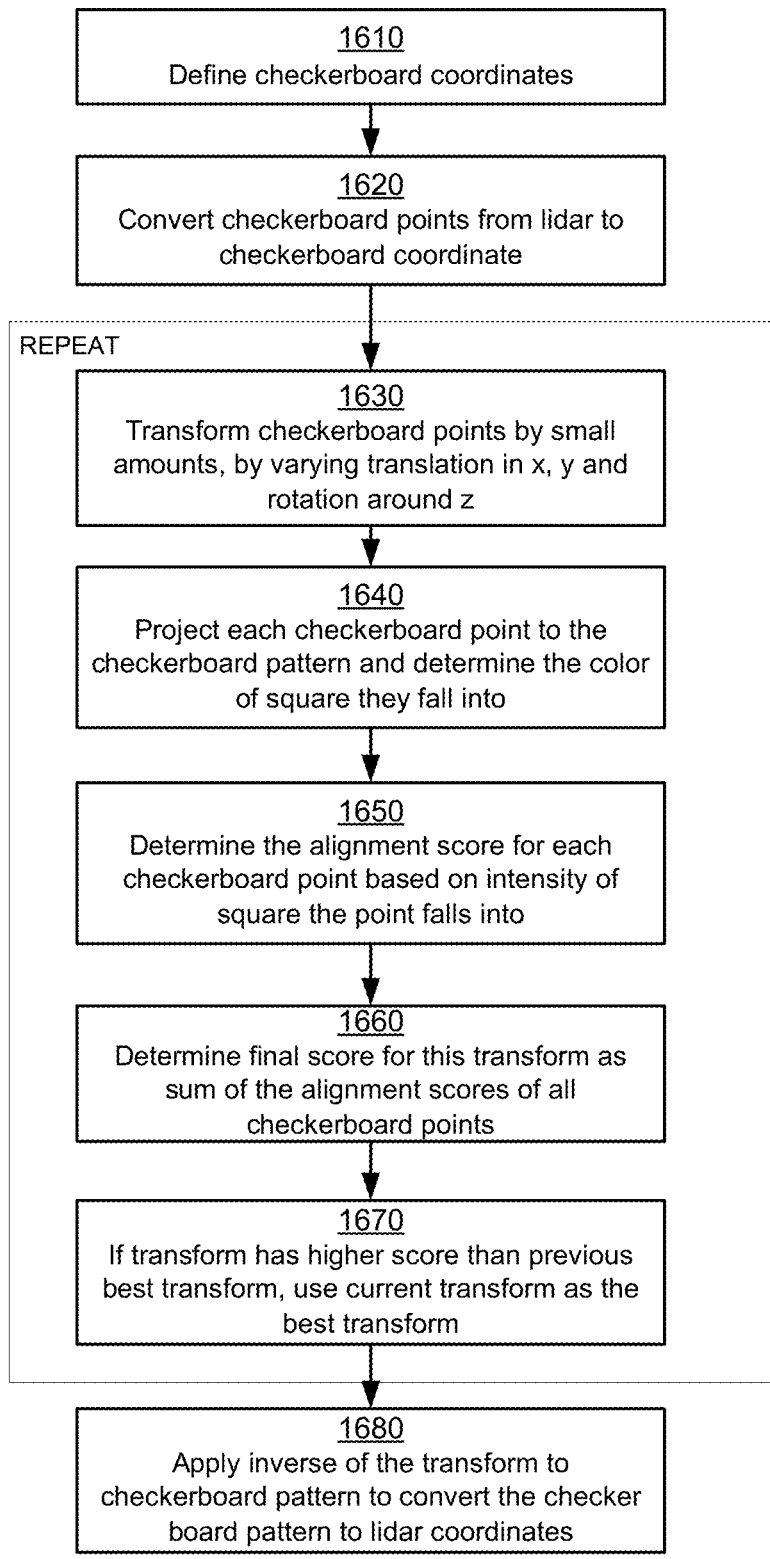
FIG. 16 shows a flowchart illustrating the process of refining the checkerboard pattern using intensity data, according to an embodiment.

According to the definition of lidar intensity, the black squares on the checkerboard should produce near-0 intensity values, while the white squares on the checkerboard should be close to 100. Given this information, the sensor calibration module 290 performs a full search in a small neighborhood of the parameter space, by varying the location of the checkerboard pattern, and measures the alignment of black and white squares to underlying intensity data FIG. 16 shows a flowchart illustrating the process of refining the checkerboard pattern using intensity data, according to an embodiment.

The sensor calibration module 290 defines 1610 checkerboard coordinates. In an embodiment, the sensor calibration module 290 defines 1610 checkerboard coordinates with origin at the top-left corner of the checkerboard pattern, X-axis pointing down along the short side, Y-axis pointing right along the long side, and Z-axis pointing towards the lidar. The sensor calibration module 290 converts 1620 points of the checkerboard pattern from lidar to checkerboard coordinates.

The sensor calibration module 290 repeats the steps 1630, 1640, 1650, 1660, and 1670. The sensor calibration module 290 transforms 1630 checkerboard points by small amounts, by varying translation in x, y and rotation around z. The sensor calibration module 290 projects 1640 each checkerboard point to the checkerboard pattern and determine the color (black or white) of square that the point falls into. The sensor calibration module 290 determines 1650 the alignment score for each checkerboard point based on intensity of square the point falls into.

In an embodiment, the sensor calibration module 290 determines 1650 the alignment score for each checkerboard point as a value matching the intensity if the checkerboard point falls in a white square and as a value (255—intensity) if the checkerboard point falls in a black square. The sensor calibration module 290 determines 1660 a final score for this transform as sum of the alignment scores of all checkerboard points. If the sensor calibration module 290 determines that the current transform has higher score than the previous best transform, the sensor calibration module 290 uses the current transform as the best transform. Accordingly, the sensor calibration module 290 uses the transform (i.e., delta of translation in x, y and rotation around z) with highest alignment score as the final transform.

The sensor calibration module 290 applies the inverse of this transform to the checkerboard pattern to convert the checkerboard pattern back from checkerboard coordinates to lidar coordinates. The sensor calibration module 290 uses the converted checkerboard corners as the final locations of checkerboard corners.

The steps 1630, 1640, 1650, 1660, and 1670 that are repeated perform a full search for 3 of the 6 degrees of freedom of a rigid transform. Accordingly, the sensor calibration module 290 assumes that the plane fitted in the previous iteration is correct, and only allows in-plane transform for refining the checkerboard pattern. This performs better than doing a full 6 degrees of freedom search, as (1) the plane fitting step was already performed using a robustness estimator (RANSAC) and processes multiple point samples, thereby reducing the impact of noise in range, so refinement using intensity is unlikely to improve it, and (2) with a lower dimensional search space, the system can search a bigger neighborhood with higher computational efficiency.

There can be noise in intensity data as well. There can be a significant variance in intensity among scan lines. For example, when the lidar faces a white wall, different intensity values can be observed among different scan lines, even though the reflectivity of the wall should be uniform. Similarly, when the laser hits an intensity boundary, for example, from plastic board to reflective tape, there may be a gap of 4-5 missing lidar points near the boundary. This may happen since lasers can get saturated by the sudden increase in reflectivity.

In an embodiment, the sensor calibration module 290 uses two additional constraints on intensity-based refinement. The sensor calibration module 290 skips refinement for checkerboards that are too far away (i.e., more than a threshold, for example a threshold of 10 meters) from the lidar. This is so because for checkerboard patterns based on very far checkerboards, too few points may be available on the checkerboard for robust alignment. Furthermore, sensor calibration module 290 measures the maximum movement of any checkerboard corner before and after refinement. The sensor calibration module 290 claims failure if it exceeds certain threshold (e.g., 5 cm). This is so, because the sensor calibration module 290 assumes that the checkerboard fitted from previous steps should already be fairly accurate, and if large modifications need to be made, it is probably caused by noise in the intensity data. Accordingly, the sensor calibration module 290 decides to skip this frame and try another frame.

Combining Left Camera and Right Camera Points

The standard input to a PnP solver includes a set of 3d-to-2d point correspondences and a 3×3 camera matrix. The sensor calibration module 290 has two sets of 2d points extracted from left and right cameras, corresponding to the same set of 3d points extracted from lidar. Since the left and right cameras are stereo rectified, their projection matrices are in the following form, where $P_{left}$ is the projection matrix of the left camera and $f_{right}$ is the projection matrix of the right camera.

$$P_{left}=[f_x,0,c_x,0;0,f_y,c_y,0;0,0,1,0]$$

$$P_{right}=[f_x,0,c_x,t;0,f_y,c_y,0;0,0,1,0]$$

The two projection matrices differ in the $4^{th}$ element where the right camera has an offset $t=T_x \cdot f$ where $T_x$ is the relative translation in camera x coordinate in meters.

If the system can tweak the 3d points in a way that cancels t, it will be able to use the same 3×3 matrix for both cameras. Given a 3d point in homogeneous coordinate (x,y,z,1), it projects to the following image coordinate in the right camera:

$$(u,v,w)=(f_x \cdot x+c_x \cdot z+t, f_y \cdot y+c_y \cdot z, z)$$

In this equation, only u is affected by t. The sensor calibration module 290 removes t by transforming x to x' such that, $$f_x \cdot x+c_x \cdot z+t=f_x \cdot x'+c_x \cdot z$$

$$\Rightarrow x'=x+t/f_x=x+T_x$$

Accordingly, the sensor calibration module 290 modifies the x coordinate of each 3d point for the right camera by adding $T_x$ to it. This allows sensor calibration module 290 to use identical camera matrices for both left and right cameras and thereby optimize the 3d-to-2d projection for both cameras simultaneously.

Still Frame Selection

The sensor calibration module 290 avoids using frames for calibration where the checkerboard is moving. For almost all lidar devices, all points are not captured at the same time. For example, VELODYNE rotates at 10 Hz and captures points column by column. If the checkerboard moves during the duration of the scan (0.1 second), the captured point cloud may not be geometrically consistent, as it captures different parts of the checkerboard at different times.

In some embodiments, as part of the calibration procedure, the sensor calibration module 290 requires the operator to hold the checkerboard still for at least 3 seconds at each spot. This section describes an automatic algorithm for selecting these still frames for calibration.

Techniques based on entire point clouds or entire images may not work well, because even if the system requires the checkerboard to be still, other objects (e.g., people) can move in the environment. The system may select not only still frames, but also distinct ones. Furthermore, if a checkerboard stays still for 3 seconds (say a batch of 30 frames), the system may only select a single frame out of this batch of frames.

The sensor calibration module 290 initializes 1710 sets H and S as empty lists, where H represents historical checkerboard locations and S represents selected frames. The sensor calibration module 290 repeats the following steps. The sensor calibration module 290 selects 1720 a new frame and corresponding left and right camera images. The sensor calibration module 290 detects 1730 checkerboard pattern in both left and right camera images. The sensor calibration module 290 triangulates 1740 corresponding 2d corners from left and right camera images to determine their 3d locations in camera coordinate. The sensor calibration module 290 adds 1750 the 3D locations of corners to set H for future reference. The sensor calibration module 290 compares the 3D locations of corners of the checkerboard to the 3D locations of corners in set H to determine whether the movement between 3D locations of corners compared with 3d locations of corners in the set H at k seconds ago (for example, 1 second) is less than x cm. If the sensor calibration module 290 determines that the movement between 3D locations of corners compared with 3d locations of corners in H at k seconds ago is less than the threshold distance, the sensor calibration module 290 marks the frame at k seconds ago as a still frame and selects it as a candidate still frame. The sensor calibration module 290 compares the candidate still frame to all frames in S. If the sensor calibration module 290 determines that the minimum movement between current frame and any frame in S is larger than a threshold distance, for example, 20 cm, the sensor calibration module 290 determines that this candidate frame is likely to be a distinct still frame and adds the candidate frame to set S. The sensor calibration module 290 returns the set S as the set of still frames.

Figure 17:
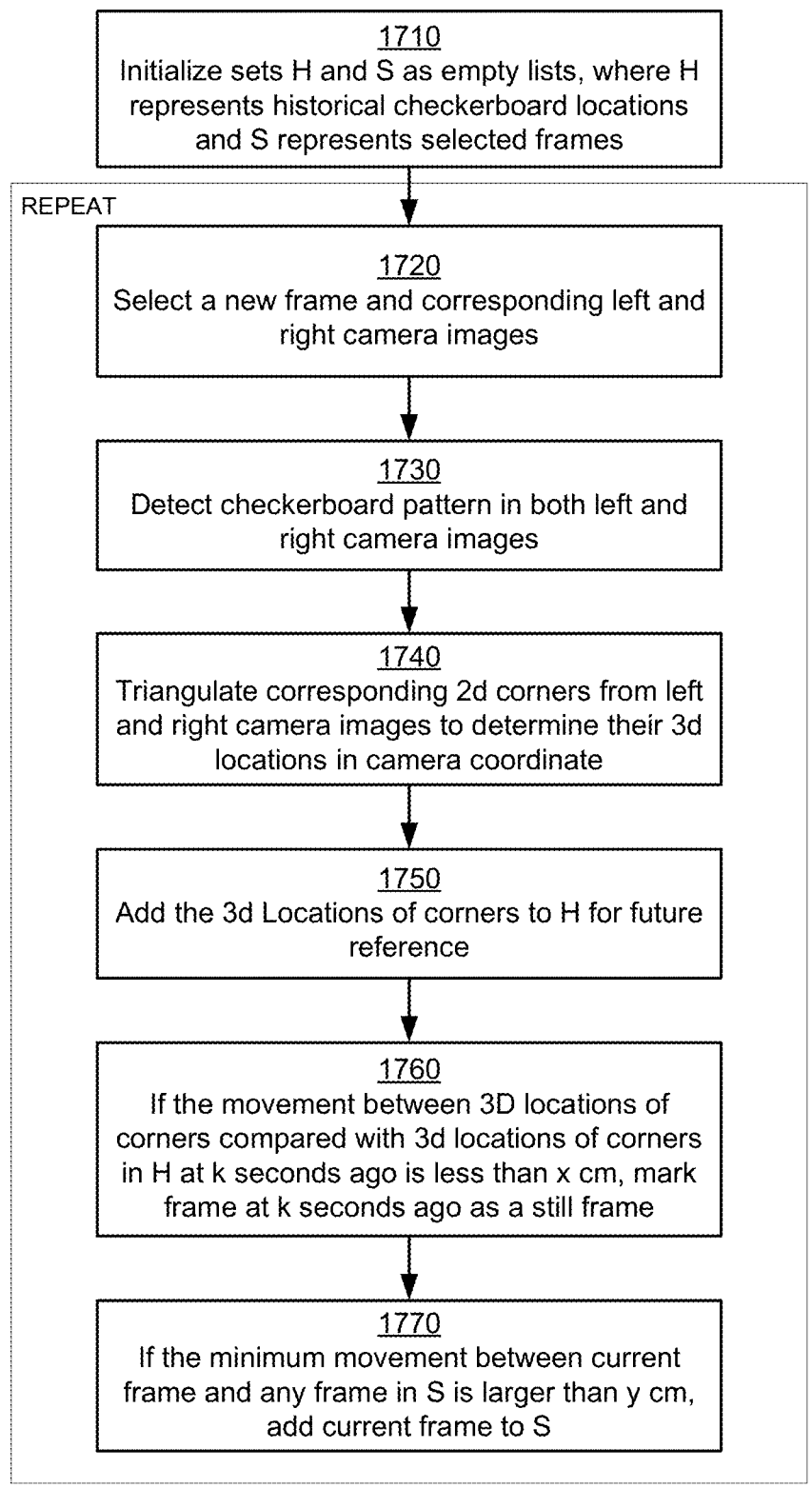
FIG. 17 shows a flowchart illustrating the process of selecting a still frame, according to an embodiment.

The process shown in FIG. 17 can be executed either online or offline as post processing. The output of the process shown in FIG. 17 provides a list of frames for use as input calibration data.

The embodiment illustrated in FIG. 17 above relies on triangulation of checkerboard corners. Accordingly, the process may not work for single-camera setups, and in order for a frame to be considered for selection, both views must see the checkerboard in full. This means the HD map system may not get constraint near image boundary as it is likely to be partially outside for the other view. Such constraints may be relevant for robust calibration. Furthermore, triangulation errors can be amplified when the checkerboard is farther away, causing unstable results. Following embodiments of still frame selection address these issues.

The sensor calibration module 290 detects checkerboard corners from the image from a single view. Since the HD map system has the knowledge of the dimensions of the checkerboard (grid size and row/column count), the sensor calibration module 290 determines the 3D coordinate of each checkerboard corner in checkerboard coordinate. The checkerboard coordinate is defined to be centered at the upper left corner, with X-axis pointing along the short side, Y-axis pointing along the long side, and Z-axis pointing towards the camera. With the coordinate system defined, the sensor calibration module 290 derives the 3d coordinate for each corner, thereby getting a list of 3d-to-2d correspondences.

The sensor calibration module 290 then determines the checkerboard-to-camera transform (a rotation and translation) by solving a PnP problem using, e.g., Levenberg-Marquardt. This works as long as one view shows the checkerboard in full. If the autonomous vehicle does have a stereo camera and both views see the checkerboard in full, the system can use the method explained above in the "Combining Left/Right Camera Points" section to combine both constraints into one PnP problem.

After processing each frame, the sensor calibration module 290 obtains a list of checkerboard-to camera transforms $\{T_i\}$. Since the camera was never moved during the entire sequence, the sensor calibration module 290 uses the list of transforms to measure the checkerboard movement between any pair of frames. Given any checkerboard point X in 3D checkerboard coordinate in frame i, the sensor calibration module 290 determines the projected position of the point X in frame j using the equation $X'_j=T_j^{-1}T_iX_i$. If there is no movement, then $T_i=T_j$ and the two cancel out resulting in $X'_j=X_j$. The sensor calibration module 290 determines the amount of movement by the difference between $X'_j$ and its actual position in frame j as given by $d(X,i,j)=|X'_j-X_j|= |T_j^{-1}T_iX_i-X_j|$. Given two detected checkerboard patterns, each comprising a list of checkerboard corners, $C=(X_i)$, the sensor calibration module 290 determines their movement by using the equation $m(C,i,j)=\max_{X\in C}d(X,i,j)$.

Thus, the sensor calibration module 290 uses a modified greedy algorithm to still walk all frames, and select a frame if and only if its movement is small compared to its neighbors: $m(C,i,i-1)<x, m(C,i,i+1)<x$ and its movement is large compared to existing selections: $m(C,i,s)>y, s\in\{S\}$, where e.g., x=1 cm and y=20 cm.

Accordingly, the sensor calibration module 290 executes the following steps (as illustrated in FIG. 11): (1) Select still frames for calibration. In this step, the sensor calibration module 290 selects all the static views of the checkerboard. (2) Run the first pass of lidar-to-camera calibration, using nearby checkerboard patterns only. Step 2 bootstraps initial lidar-to-camera calibration by using frames in which checkerboard is near the car (e.g., within 3 meters from the lidar). In this scenario the system does not need to rely on any prior knowledge (such as a rough lidar-to-camera transform) to locate the checkerboard in 3d, because the checkerboard points would naturally fit the dominant plane within the 3 meter radius. The sensor calibration module 290 then computes an initial lidar-to-camera calibration by solving the PnP problem using the small subset of static views. (3) Run the second pass of lidar-to-camera calibration, using results from previous step as initial estimate, and use checkerboard patterns from all frames to refine the transform. In step 3, the sensor calibration module 290 relies on the initial lidar-to-camera transform, and may use stereo triangulation to robustly locate the checkerboard in 3d even when it is far away from the car. This allows the sensor calibration module 290 to use all the static frames to optimize the lidar-to-camera transform and get the final output.

Calibration Based on Reflective Tape

In some embodiments the HD map system performs calibration using one video (calibration sequence) with a checkerboard, and a second video (test sequence) with a board with a static tape pattern based on reflective tape on it, which is more suitable for visualizing calibration error. Accordingly, the process comprises a first video with calibration sequence of frames with the checkerboard pattern and a second video with a test sequence of frames with reflective tape based pattern.

The calibration sequence includes frames with checkerboard pattern placed at various spots including a set S1 of spots in a close range in front of the car, i.e., within a threshold distance, a set S2 of spots within medium range, i.e., greater than a first threshold but less than a second threshold, a set of spots in a far range, i.e., range greater than a threshold distance. For example, the HD map system receives a video with about 25 spots, about 5 in front of the car (within 3 meters to the lidar), about 10 in the medium range (about 6 meters away from the lidar), and about 10 in the far range (about 10 meters away from the lidar). For each layer, the spots are equally spaced out to cover the entire shared field of vision. The checkerboard is fully contained by both views to be useful, so the checkerboard needs to move in smaller steps near the boundary of shared field of vision, to ensure that it covers the shared field of vision as much as possible. If the checkerboard is partially outside of a camera view, that frame is dropped, so having more frames will not hurt calibration, just waste more time.

The HD system assumes that the checkerboard is held about 45 degrees angled to the ground, with left side higher than the right side (from holder's point of view). The way the checkerboard is held determines the pre-measured offsets of the pattern on the checkerboard.

The test sequence is based on a black board with reflective tapes on it. The strong contrast of intensity near tape boundaries makes it more suitable for visualizing calibration error. To simulate the usage of lidar-to-camera calibration, the board is held by the side of the car at different distances (to simulate traffic sign projection), and laid on the ground in front of the car (to simulate lane line and crosswalk projection).

In an embodiment, the HD map system shows debug images upon completion of the calibration process and test process showing lidar points overlaid on top of left and right images, color-coded by intensity so that a user can inspect the alignment between lidar points and image pixels. The HD map system displays a user interface that allows the user to select lidar points and corresponding image pixels (e.g., corresponding to the same tape boundary). The HD map system receives the user selection and measures the 3d distance (in cm). The HD map system ensures that the error does not exceed a threshold (half OMap cell) in all views.

Figure 18A:
FIG. 18A shows a test sequence based on a striped pattern according to an embodiment.
Figure 18A:
Figure 18A:
Figure 18A:
Figure 18A:
Figure 18A:
Figure 18B:
FIG. 18B shows sample debug images for a test sequence, according to an embodiment.
Figure 18B:
Figure 18B:

FIG. 18A shows a test sequence based on a striped pattern according to an embodiment. As shown, a black board is held with reflective tape around the car to simulate traffic signs. The board is laid on the ground in front of the car to simulate lane lines. The board is kept at varying distances including close (less than a predetermined threshold) and far (greater than a predetermined threshold). FIG. 18B shows sample debug images for a test sequence, according to an embodiment.

Static Tape Pattern

In some embodiments, the test sequence is replaced with a static setup in the calibration environment (for example, garage). There are vertical stripes of reflective tape on the wall facing the vehicle, and possibly on the side walls to cover the horizontal field of vision as much as possible (to simulate traffic signs). There is reflective tape on the ground in front of the car (to simulate lane lines and crosswalks). The reflective tape is different in color with background material (e.g., dark color tapes for white wall) so that they can be easily differentiated from images.

Similar to the test sequence, the HD map system checks the alignment for each reflective tape between their lidar projection and image pixels. There will be a viewer to facilitate error estimation, which allows the user to slightly tweak one of the 6 degrees of freedom in the calibration matrix to achieve better alignment between image and lidar projection. By the amount of tweaking (e.g., 0.1 degree change in pitch, 0.1 degree in yaw and 2 cm in x), the HD map system estimates the error in the calibration matrix accordingly.

Figure 19A:
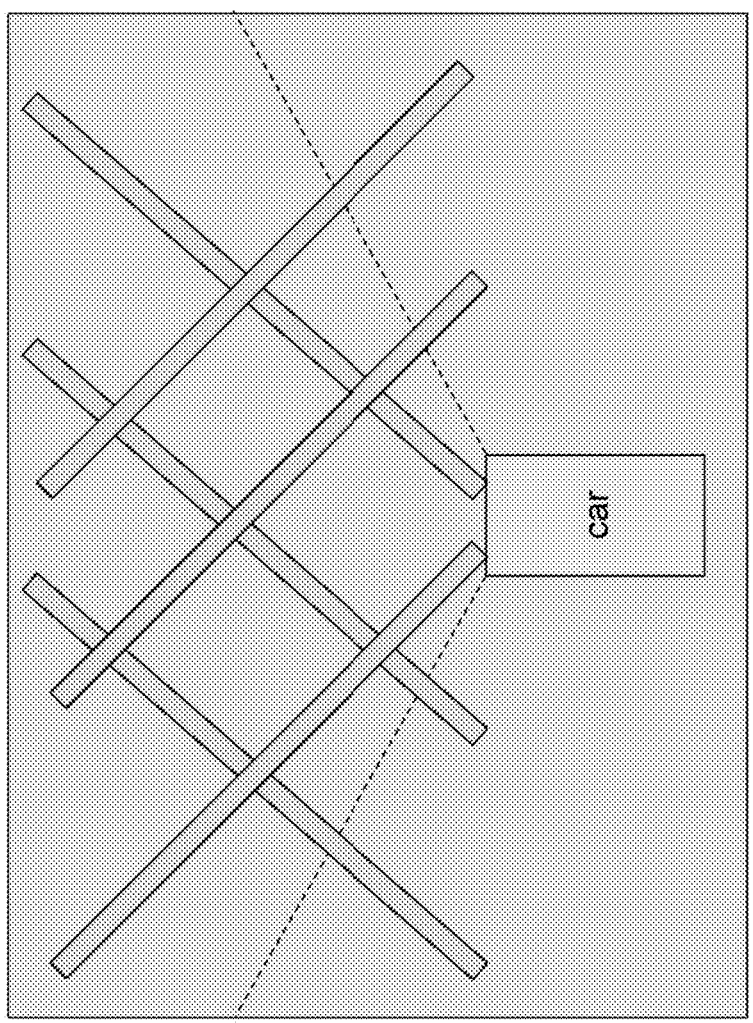
FIG. 19A shows a top-down view of a reflective tape pattern on the ground, according to an embodiment.
Figure 19B:
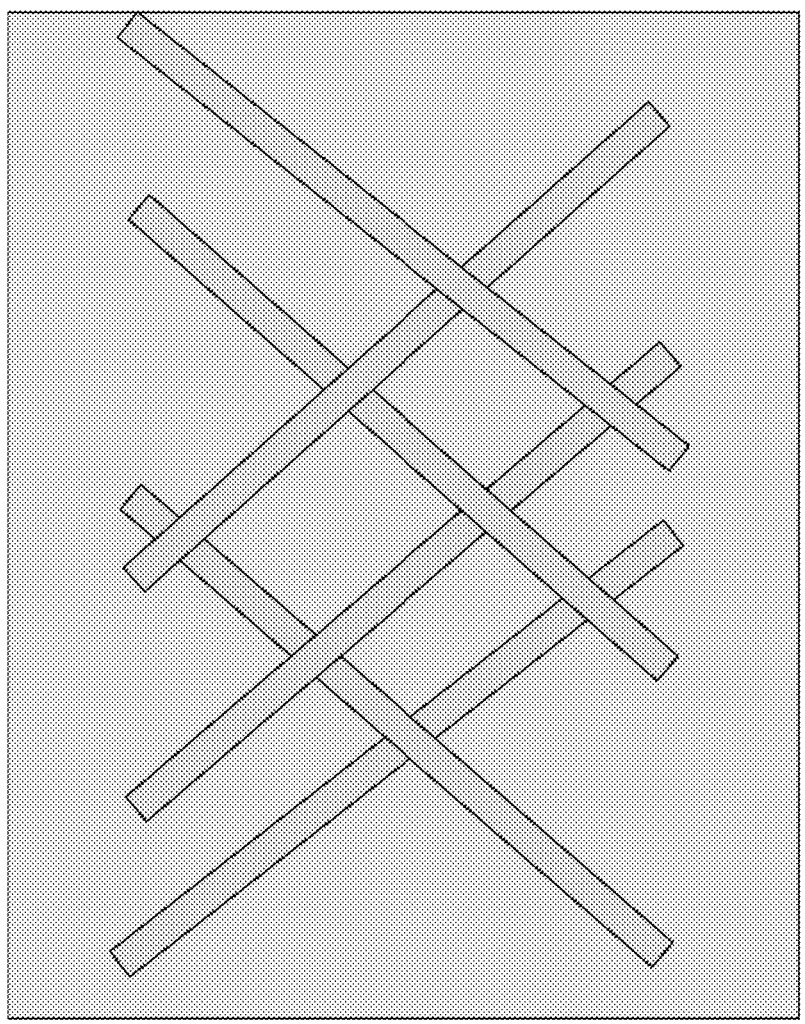
FIG. 19B shows a front view of the reflective tape pattern on the wall, according to an embodiment.

FIGS. 19A-B show example setups of reflective tapes. FIG. 19A shows a top-down view of a reflective tape pattern on the ground, according to an embodiment. Tapes are put in front of the car within camera field of view (specified by dashed lines). The tapes have a different color from the ground so that they can be easily distinguished from camera view. Tapes are made of a material that has very different reflectivity from the ground so that tape boundary can be easily distinguished from lidar point cloud. Embodiments can use different patterns and the selection of the exact pattern can vary and preknown measurements are not needed. The pattern should (1) fill camera field of view as much as possible, and (2) provide constraints in all 6 degree of freedoms. E.g., if only vertical tapes are placed on the ground (parallel to the car direction), there will be little constraint to tx (translation in car direction) of the transform. Similarly, if only horizontal tapes are placed on the ground (orthogonal to the car direction), there will be little constraint to ty (translation orthogonal to car direction). Embodiments use tapes in at least two diagonal directions to ensure that error in any of the 6 DoF can be spotted as misalignment somewhere in the pattern.

FIG. 19B shows a front view of the reflective tape pattern on the wall, according to an embodiment. Similar to FIG. 19A, the pattern is not strict and preknown measurement is not needed. However, the pattern should (1) fill camera field of view as much as possible—which means a pattern may be needed on the wall to both sides of the car as well as in front of the car, and (2) provide constraints in all 6 degree of freedoms.

Placement of Checkerboard Pattern

In an embodiment, the checkerboard pattern (or any other pattern) used for calibration of sensors is manually moved by a person. A user may view the sensor data to determine whether the various portions of the area viewed by the sensor are covered by the different places where the checkerboard pattern is placed. If certain portion of the viewing area is not covered, there is a likelihood that the calibration is not accurate. For example, if the checkerboard is mostly placed on the left half of the viewing area and there is no placement in the right half of the viewing area, the sensor calibration may not be accurate.

In an embodiment, the HD map system detects the presence of the checkerboard pattern in sensor data and determines coordinates of the corners of the checkerboard pattern. The HD map system maintains a shape of the overall viewing area of sensor. The HD map system and overlays the areas where the checkerboard pattern occurs in images and lidar scans that are processed based on the determined coordinates of the checkerboard corners. Accordingly, the HD map system determines regions of the viewing area that have not yet been covered.

In an embodiment, the HD map system determines portions of the viewing are that are not yet covered by iteratively moving a template representing the checkerboard pattern within the shape represented by the viewing area and determining whether the new area covered by the template includes a substantial portion of viewing area that has not been covered so far by the placements of checkerboard pattern. Accordingly, the HD map system iteratively determines various positions for the checkerboard pattern in the viewing area and maps them to a location and orientation of the checkerboard pattern in the real world.

The HD map system provides a position and orientation for the next placement of the checkerboard pattern, for example, by specifying a distance from the vehicle where the checkerboard pattern should be placed and an orientation, for example, whether it should be laid on the ground, held vertically, and if the pattern has stripes, whether the stripes should be at an incline pointing top left to bottom right or from bottom left to top right. In an embodiment, the HD map system provides real time direction to a person holding the checkerboard pattern, whether the person should move away from the vehicle, towards the vehicle, tilt the pattern appropriately, and so on.

The direction may be provided via an application, for example, a client application executing on a mobile device. The HD map system maintains various variables including an amount of the portion of the viewing area that has been covered, an amount of left boundary that has been covered, an amount of right boundary that has been covered, an amount of bottom boundary that has been covered, an amount of top boundary that has been covered, and so on. The HD map system evaluates these variables and determines the directions for the next placement of the pattern for sending to the client device of a user managing the placements.

In an embodiment, the HD map system presents a heat map via a user interface, such that the heat map shows an indication of how well each portion of the viewing area of the sensor is covered. In an embodiment, the HD map system presents multiple heat maps, for example, one heat map for a close placement of the pattern and another heat map for a distant placement of the pattern. Accordingly, the HD map system presents a plurality of heat maps, each heat map for a different depth value.

In an embodiment, instead of a heat map, the HD map system presents a user interface that divides the viewing area into different portions and associates each portion with a score indicating the amount of coverage via the pattern for that portion. For example, a low score value indicates less coverage and high score value indicates higher coverage.

Figure 20:
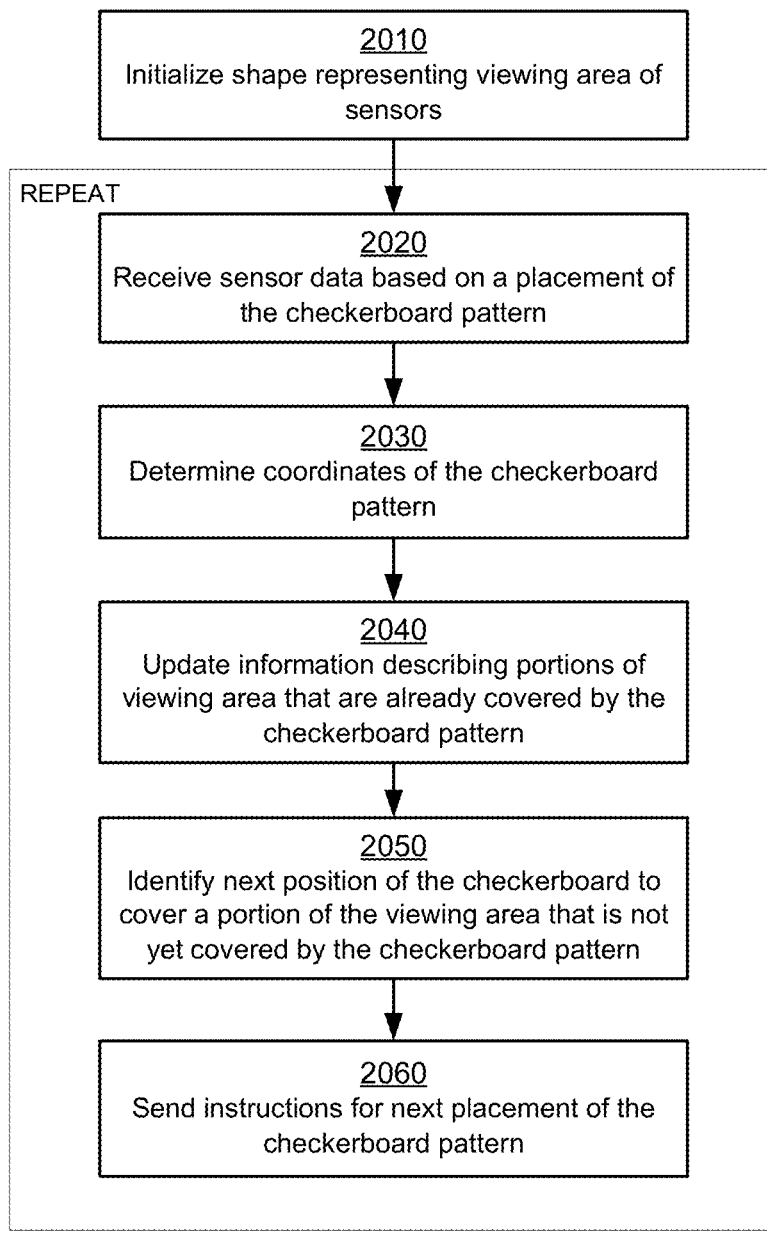
FIG. 20 shows a flowchart illustrating the process of determining a placement of the checkerboard pattern, according to an embodiment.

FIG. 20 shows a flowchart illustrating the process of determining a placement of the checkerboard pattern, according to an embodiment. The checkerboard pattern placement module 930 initializes a shape representing the viewing area of the sensors. The shape may be specified using the lidar coordinates or any other 3D coordinate system. The checkerboard pattern placement module 930 repeats the following steps 2020, 2030, 2040, 2050, and 2060 of the process. The checkerboard pattern placement module 930 receives sensor data based on a placement of the checkerboard pattern, for example, the most recent placement of the checkerboard pattern. In an embodiment, the placement is specified using the depth and orientation of the checkerboard. Alternatively, the placement is specified by identifying coordinates of a plurality of corners. The checkerboard pattern placement module 930 determines 2030 the coordinates of the checkerboard pattern based on the placement. For example, the checkerboard pattern placement module 930 determines coordinates of all the corners of the checkerboard pattern.

The checkerboard pattern placement module 930 updates 2040 information describing the portions of the viewing area that are covered by the placements of the checkerboard pattern processed so far. Determine portions of viewing area that are already covered by the checkerboard pattern. The checkerboard pattern placement module 930 identifies 2050 the next position of the checkerboard pattern to cover a portion of the viewing area that is not yet covered by the placements of the checkerboard pattern processed so far. The checkerboard pattern placement module 930 sends instructions re next placement of the checkerboard pattern based on the position of the identified portion of the viewing area. In an embodiment, the checkerboard pattern placement module 930 displays a user interface displaying the position of the portion of the viewing area that needs to be covered next. In another embodiment, the checkerboard pattern placement module 930 gives real time instructions directing a user to move so as to align the checkerboard pattern held by the user with the identified position. In another embodiment, the checkerboard pattern is automatically positioned using a drone. The checkerboard pattern is attached to a drone and the HD map system sends instructions to the drone using an API (application programming interface) of the drone to move the drone to the identified position. The HD map system repeats the above instructions until all portions of the viewing area are covered. In an embodiment, the HD map system repeats the entire process of covering the viewing area for a plurality of depths, for example, for a close-up position of the checkerboard pattern and for a distant position of the checkerboard pattern. In an embodiment, the vehicle is driven to a facility that has previously placed patterns at various locations including close to the vehicle and at distant locations. The facility uses automatic or manual mechanical devices such as arms to move the checkerboard patterns in different positions. For example, an arm places the checkerboard pattern in front of the vehicle and close to the vehicle. The arm removes the checkerboard pattern from the front of the vehicle. A different arm places one or more checkerboard patterns at a distant location from the vehicle. The process is repeated to get full coverage of the viewing area.

Calibration Based on 3D-to-3D Transform

In one embodiment, a client application of the HD map system, for example, a point cloud viewer displays a scene based on the point cloud. The user interface of the client application allows users to select points of the point cloud, for example, using a pointing device such as a mouse based cursor. The client application receives from the user, selection of three corners of the checkerboard in the point cloud. The HD map system refines the corner locations based on intensity alignment. The HD map system thereby obtains a set of 3d checkerboard corners in the lidar coordinate.

From the same frame, the HD map system detects checkerboard pattern in the left and right images and triangulates 3d checkerboard corners in the camera coordinate. With a set of corresponding points in the two coordinate system, the system determines a least squares solution for the rigid transform between lidar and camera coordinates. In some embodiments, this process receives the coordinates of corners from multiple frames. The HD map system uses RANSAC in the rigid transform solver to account for noise in the checkerboard corners detected from lidar points. Embodiments of the invention provide an improvement by automating the detection of checkerboard corners from lidar points (that achieves higher precision by separating plane fitting from intensity based refinement), and using PnP solver for 3d-to-2d correspondences, which avoids the error in stereo triangulation.

Edgel Based Calibration of Sensors

The edgel based calibration module 950 performs lidar-to-camera calibration by detecting edgels in both lidar based point cloud and camera based images, and optimizing the alignment between those edges. An edgel corresponds to edges representing boundaries of objects or shapes in an image, for example, objects or shapes representing edges of buildings, traffic signs, poles, figures painted on the road such as turn arrows, lane lines, and so on. The edgel based calibration module 950 obtains 3D points from the lidar scan and 2D points from the image.

These embodiments are advantageous since they can be used for performing calibration of sensors using real world data representing objects/images that are obtained by a vehicle driving on the road. Accordingly, these embodiments can be used to perform calibration without requiring use of calibration object, for example, a checkerboard or requiring use of a controlled environment meant specifically for calibration.

The HD map system achieves higher calibration accuracy by using frames where the car is stopped at intersections, to prevent other sources of error (e.g., pose error) from affecting calibration. One advantage of these solutions is that they are capable of online calibration during driving of the vehicle. In some scenarios, due to the high variance in real world data, the process may not converge all the time, and may result in lower precision even when the process does converge.

Calibration parameters drift over time, either caused by vehicle shaking or material expansion due to heat. For data collection, test vehicles, or research vehicles, performing calibration on a regular basis may not be very inconvenient since the number of times the calibration is performed is not very high. However, if there is a big fleet of vehicles or if there is a large number of commercial vehicles that are operating, requiring all these vehicles to be calibrated in a controlled environment is time consuming as well as resource consuming. Also, requiring a controlled environment places burden on the user of the vehicle to take time and resources for performing calibration.

However, embodiments of the invention perform online calibration by refining calibration parameters using real time data while the car is driving. As a result, the process does not require a large number of vehicles to be calibrated in controlled setting, thereby providing significant savings in terms of time and resources.

Figure 21:
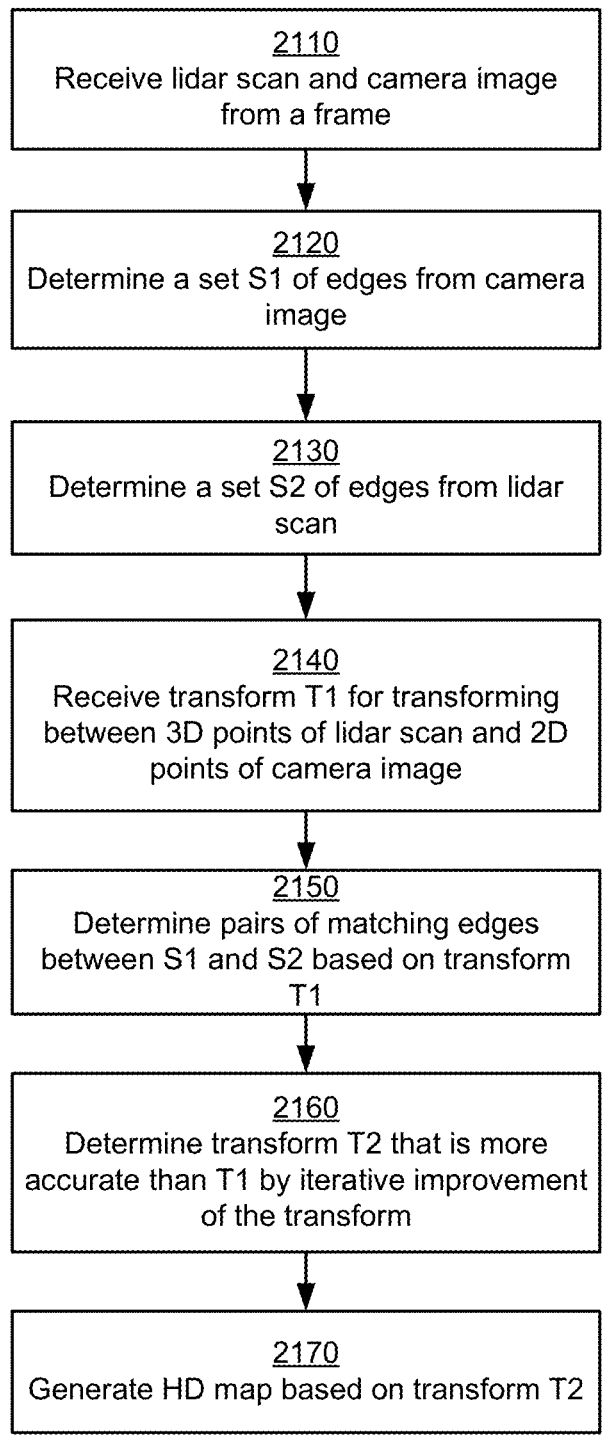
FIG. 21 illustrates the overall process for performing calibration of sensors of a vehicle based on edgel detection, according to an embodiment.

FIG. 21 illustrates the overall process for performing calibration of sensors of a vehicle based on edgel detection, according to an embodiment. The edgel based calibration module 950 receives 2110 a lidar scan captured by the lidar of the vehicle and a camera image captured by a camera of the vehicle. The lidar scan and the camera image are obtained from a frame captured at the same time. Accordingly, the lidar scan and the camera image substantially represent the same scene or surroundings of the vehicle or at least have a significant overlap in the portion of the scene captured by the lidar and the camera. If there is a time difference between the capture of the lidar scan and the camera image, the edgel based calibration module 950 performs a temporal correction, for example, by transforming the 3D points to a position corresponding to the time of capture of the image.

The edgel based calibration module 950 determines 2120 a set S1 of edges from the camera image by processing the pixels of the camera image. The set S1 of edges may be determines by an edge detection technique, for example, a gradient based edge detection technique, a Laplacian based edge detection technique, or a neural network based edge detection technique. In an embodiment, the edgel based calibration module 950 detects edges in the camera image by identifying changes or discontinuity in image brightness. The edgel based calibration module 950 identifies points at which image brightness changes sharply and identifies a set of curved line segments termed edges passing through the identified points.

Figure 22:
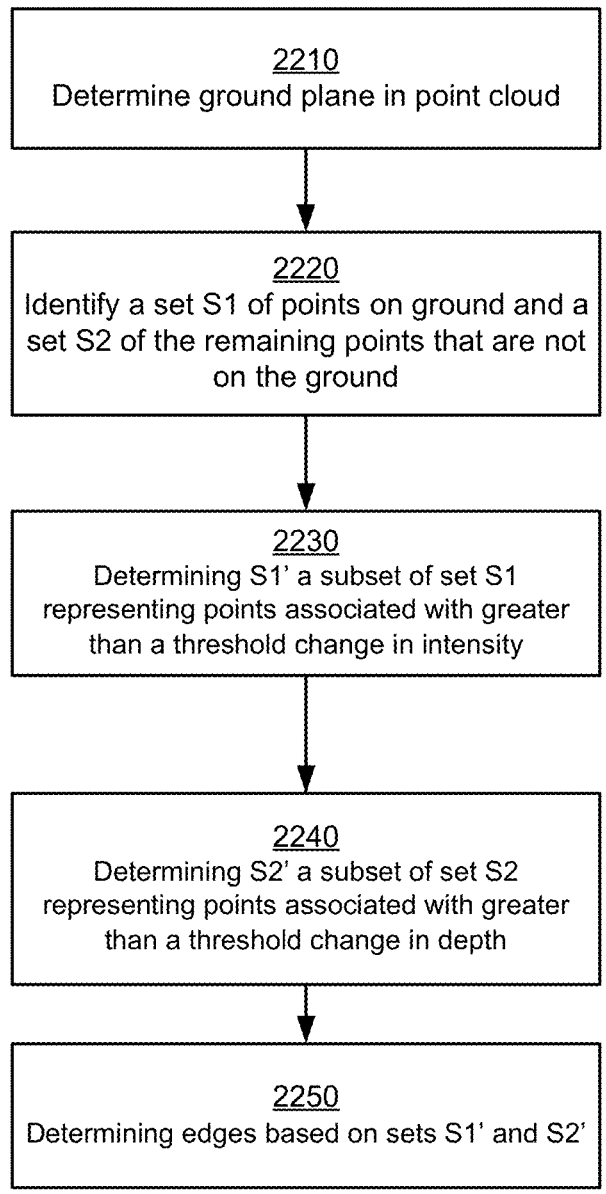
FIG. 22 illustrates the process for processing the ground points separate from the remaining points for performing calibration of sensors of a vehicle based on edgel detection, according to an embodiment.

The edgel based calibration module 950 further determines a set S2 of edges from the lidar scan. The edgel based calibration module 950 determines an edge in the lidar scan based on depth discontinuities in the 3D points of the lidar scan as well as intensity discontinuities in the 3D points of the lidar scan. The edgel based calibration module 950 measures intensity discontinuities for identifying edges based on points on the ground and uses depth discontinuities to identify edges based on points that are above the ground. FIG. 22 further illustrates the process for determining edges in the lidar scan.

The edgel based calibration module 950 receives 2140 a transform T1 for transforming between 3D points of lidar scan and 2D points of camera image. In an embodiment, the transform is 6-dimensional transform between the two sensors, i.e., the lidar and the camera. Specifically, the six values are the x, y, and z translations, and the roll, pitch, and yaw Euler angle rotations between the two sensors. In an embodiment, the transform operation between lidar and camera sensors comprises the following steps. The first step transforms 3D points from lidar coordinates to 3D points in camera coordinates (both in 3D) using equation $X_{camera}=T_{lidar2camera}*X_{lidar}$ where $T_{lidar2camera}$ is the 6 DoF transform between lidar and camera coordinates. The next step projects points in camera coordinate into two dimensional image space using equation $x=P*X_{camera}$ where P is the 3×4 projection matrix of the camera, encoded by focal length and principal point position.

The edgel based calibration module 950 determines 2150 pairs of matching edges between S1 and S2 based on transform T1. The edgel based calibration module 950 determines 2160 a transform T2 that is more accurate than T1 by iterative improvement of the transform T1. The edgel based calibration module 950 2160 initializes the second transform to the first transform. The edgel based calibration module 950 iteratively modifies the second transform, such that an aggregate distance between the corresponding edges of the one or more pairs of matching edges based on the second transform in a current iteration is less than an aggregate distance between the edges of the one or more pairs of matching edges based on the second transform in a previous iteration.

The edgel based calibration module 950 uses the transform T2 for various steps of HD map generation for example, to combine lidar scan data with the image data. The generated HD map may be used for various purposes, for example, for guiding an autonomous vehicle.

Techniques for calibration of sensors of a vehicle are described in the article titled Automatic Online Calibration of Cameras and Lasers, Stanford Artificial Intelligence Laboratory, co-authored by J. Levison, S. Thrun, which is incorporated herein by reference in its entirety. The process disclosed in this reference only uses off-ground points, because ground points, by definition, are continuous and never exhibit range discontinuity. The HD map system in contrast includes points from the ground, by also detecting points at intensity discontinuity, i.e., when neighboring points have a large delta in intensity. The method starts by segmenting the lidar point cloud into ground and off-ground points, by fitting a ground plane. For off-ground points, the HD map system follow Levinson's algorithm. For ground points, the HD map system uses intensity discontinuity instead of range discontinuity. The system combines range and intensity discontinuity scores in a linear fashion, where weights are adjusted such that typical vertical features (e.g., silhouette of a pole) have the same weight towards optimization as a typical ground feature (e.g., lane line boundaries). It improves the accuracy and robustness of calibration, specifically in the dimensions in which the vehicle is driving and pitch, which are poorly constrained by techniques that use off-ground points alone.

FIG. 22 illustrates the process for processing the ground points separate from the remaining points for performing calibration of sensors of a vehicle based on edgel detection, according to an embodiment.

The edgel based calibration module 950 determines 2210 a ground plane in the point cloud corresponding to the lidar scan. In an embodiment, the edgel based calibration module 950 determines a plane passing through a set of points that are immediately in front of the vehicle. For example, the edgel based calibration module 950 identifies a set of points that are in the lowest portion of the lidar scan representing the portion of the scene immediately in front of the vehicle and passes a plane through the set of points.

The edgel based calibration module 950 identifies 2220 based on the ground plane, a set S1 of 3D points on ground and a set S2 of 3D points that are above the ground, for example, 3D points representing buildings, traffic signs, and so on. Accordingly, the edgel based calibration module 950 separates the 3D points on the ground from the 3D points above the ground so that the two sets of points can be processed separately. The edgel based calibration module 950 determines edges within the set of point S1 representing ground using lidar intensity values, for example, by identifying sudden change or discontinuity in intensity values while travelling in a particular direction along the point cloud represented by the lidar scan. Accordingly, the edgel based calibration module 950 determines 2230 S1' a subset of set S1 representing points associated with greater than a threshold change in intensity. The edgel based calibration module 950 determines a change in intensity by measuring the gradient of the intensity values in the neighborhood of each point. The edgel based calibration module 950 determines a change in depth by measuring the gradient of the depth values in the neighborhood of each point.

The edgel based calibration module 950 determines edges within the set of point S2 representing 3D points above ground using lidar depth values, for example, by identifying sudden change or discontinuity in depth values while travelling in a particular direction along the point cloud represented by the lidar scan. Accordingly, the edgel based calibration module 950 determines 2240 S2' a subset of set S2 representing points associated with greater than a threshold change in depth. The edgel based calibration module 950 uses intensity for determining edges on ground since there is no depth variation for points on ground, unlike points above ground. Therefore, the edgel based calibration module 950 uses features on ground such as letters written on the road, e.g., stop, yield, and such words on the road, shapes of figures drawn on the road, for example, left turn arrow, right turn arrow, lane lines, and so on. These features are associated with intensity change and not depth change. For example, a letter written on the road may be painted in white, and the edges of the shape of the letter have a change in intensity from high intensity of the white paint to low intensity of the asphalt of the road that is adjacent to the letter. For structures above the ground, the edgel based calibration module 950 uses change in depth. For example, a pole may be at a depth of 10 meters and the structure behind the pole may be a building that is 20 meters away. As a result, edgel based calibration module 950 determines edges associated with the pole using a set of points associated with a change in depth from 10 meters to 20 meters.

The edgel based calibration module 950 determines 2250 edges based on the points in sets S1' and S2'. The edgel based calibration module 950 identifies sets of points from the set S1' or set S2' that are close to each other and determining edges representing curves or likes passing through the identified plurality of points. The edgel based calibration module 950 identifies sets of points that are close to each other by performing a clustering algorithm, for example, k-means clustering.

In an embodiment, the edgel based calibration module 950 determines an edge score representing a degree of confidence with which the point corresponds to an edge. The edgel based calibration module 950 determines the edge score for each point above ground based on a difference between the depth of the point and adjacent point. Accordingly, higher edge score represents higher difference is depth and is indicative of a higher confidence that the point corresponds to an edge. The edgel based calibration module 950 determines the edge score for each point on the ground based on a difference between the intensity of the point and adjacent point. Accordingly, higher edge score represents higher difference in intensity and is indicative of a higher confidence that the point on the ground corresponds to an edge. Since the edge scores of points on the ground are determined using a different mechanism compared to the edge scores of points above ground, edgel based calibration module 950 normalizes the two scores so that they are comparable value. In an embodiment, the edgel based calibration module 950 determines a distribution of the edge scores of points on the ground, and a distribution of the edge scores of points above ground. The edgel based calibration module 950 determines an aggregate value v1 representing the edge scores of points on the ground and an aggregate value v2 representing the edge scores of points above the ground. The aggregate value may be determined as a median value, a maximum value, a mean value or using another measure of statistical aggregate. The edgel based calibration module 950 scales the edge scores of at least one of the sets of points based on the values v1 and v2. For example, the edgel based calibration module 950 scales the edge scores of ground points by v2/v1 or scales the edge scores of above ground points by v1/v2.

In an embodiment, the HD map system performs a full (i.e., exhaustive) 6 degrees of freedom (DoF) search instead of a simple gradient descent. Gradient descent often converges to a bad solution, especially when the optimal solution is several search steps away from the starting point (which is almost always the case). Doing a full search guarantees an optimal solution within a small neighborhood in the 6 DoF search space. The edgel based calibration module 950 uses a fairly close initial estimate (e.g., the calibration results from two weeks back) to ensure that a small neighborhood is sufficient for determining a solution via an exhaustive search. For example, the HD map system may searches 1 degree for raw, pitch, yaw and 10 centimeters in translation x, y, and z.

In an embodiment, the edgel based calibration module 950 determines the size of the neighborhood in which the exhaustive search is performed based on the rate at which the calibration is performed. The edgel based calibration module 950 determines the size of the neighborhood in which the exhaustive search is performed as a value that is inversely related to the rate at which the calibration is performed. Accordingly, if the edgel based calibration module 950 performs calibration more frequently (i.e., initial estimate is more accurate), the edgel based calibration module 950 reduces the size of the search neighborhood. This is so because the initial estimate of the transform that is improved is more accurate if the HD map system uses a recently performed calibration result as the initial transform estimate.

Figure 23:
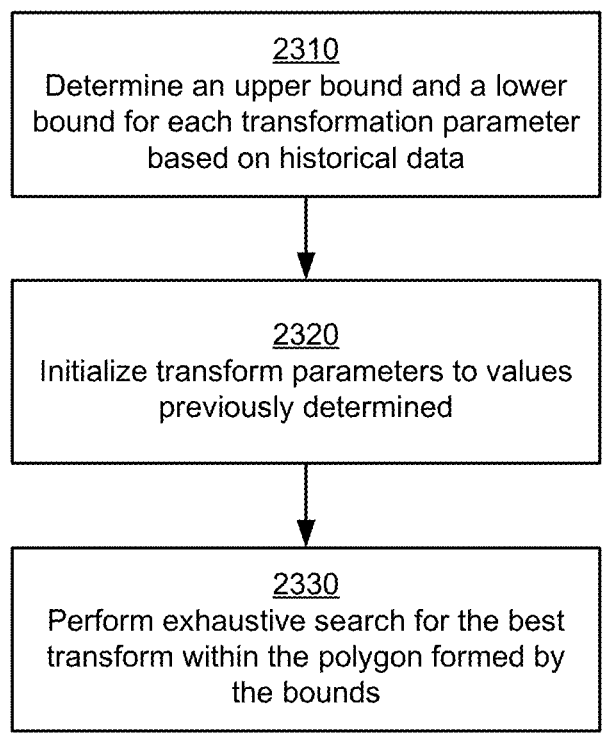
FIG. 23 illustrates the process of searching for an improved transform based on an initial transform, according to an embodiment.

FIG. 23 illustrates the process of searching for an improved transform based on an initial transform, according to an embodiment. The edgel based calibration module 950 determines 2310 an upper bound and a lower bound for each transformation parameter based on historical data. The transform has a plurality of transform parameters, each transform parameter corresponding to a dimension, for example, six transform parameters, roll/pitch/yaw and three x, y, and z translations tx/ty/tz. In an embodiment, the edgel based calibration module 950 determines the upper and lower bounds for each transform parameter based on an amount of variation in the value of the transform parameter based on historical data, for example, recent history based on driving routes along which the vehicle was driven recently. For example, a particular camera may not have been installed properly and is loose along a particular direction, there having more movement along that dimension resulting in higher drift along that dimension. As a result, if the value of that transform parameter computed in the previous iteration that performed calibration was used as the initial transform, the transform parameter is likely to have more drift compared to another transform parameter. Each transform parameter may have distinct upper and lower bounds. For example, a transform parameter t1 may have upper and lower bounds l1 and u1 respectively, whereas a transform parameter t2 may have upper and lower bounds l2 and u2 respectively where l1 is distinct from l2 and u1 is distinct from u2.

The selection of bounds for each parameters ensures that the edgel based calibration module 950 does not perform unnecessary search, for example, searching along a dimension for more than a threshold delta value even if the transform parameter corresponding to that dimension is unlikely to change more than a delta value that is much smaller than the threshold delta value. Accordingly, the ability to select the required bounds for each transform parameters makes the process of performing exhaustive search efficient.

The edgel based calibration module 950 initializes 2320 transform parameters to values that were previously determined, for example, when the sensors were calibrated the last time (i.e., the most recent transform parameter values). The edgel based calibration module 950 determines an alignment score for each transform based on a degree of match between the edges determined using the different sensors, i.e., lidar and camera. Accordingly, a better alignment score is indicative of higher degree of match between the edges.

The edgel based calibration module 950 performs an exhaustive search for the best transform within the polygon formed by the determined bounds. The exhaustive search divides the polygon formed by the determined bounds into smaller portions and determines a value of the transform parameters for a point corresponding to each portion. The edgel based calibration module 950 determines the alignment score for each point and selects the transform parameters corresponding to the point with the best alignment score.

In an embodiment, the edgel based calibration module 950 uses an iterative modification based approach that modifies the transform by varying the value of one of the transform parameters and recomputes the alignment score for the modified transform. The edgel based calibration module 950 varies a transform parameter by adding a delta value or subtracting a delta value from the transform parameter. The delta value for each parameter may be preconfigured. The edgel based calibration module 950 varies each transform parameter in each iteration and determines the alignment scores for the total number of combinations of transforms obtained by varying each transform parameter. The edgel based calibration module 950 selects the combination of transform parameters that has the highest alignment score, thereby representing the current best alignment between edges determined using the two sensors. The edgel based calibration module 950 repeats this computation by treating the current best transform as an initial transform and varying the transform parameters again. The edgel based calibration module 950 selects the best transform that results in the highest alignment score corresponding to the best alignment.

In an embodiment, the edgel based calibration module 950 combines the iterative modification based approach and the exhaustive search based approach. For example, the edgel based calibration module 950 initially performs the edgel based calibration module 950 to get closer to the solution and then switches to exhaustive search based approach to find the solution. In an embodiment, the edgel based calibration module 950 switches to the exhaustive search based approach if an aggregate measure based on the alignment scores of the edges reaches above a threshold value.

Besides real-world data representing scenes surrounding a vehicle during normal driving of a vehicle, the proposed techniques for performing edgel based calibration can also be applied to a controlled environment (e.g., a garage) decorated with calibration objects (e.g., reflective tapes on the walls and ground). The techniques do not assume any prior knowledge of scene structure, as long as there are range and/or intensity boundaries in the lidar points, and corresponding edgels in the images.

In an embodiment, to detect parameter drift over time, the HD map system uses an application comprising a user interface acting as a viewer installed in the vehicle. A user, for example, a driver of the vehicle views images shown in the viewer displaying reflective tapes in the environment and checks if point projection looks good. The application displays widgets that receive input from the user for modifying roll/pitch/yaw and tx/ty/tz by small amounts to improve point-to-pixel alignment. The application quantifies the amount of drift based on the received user input and sends an alert for re-calibration if needed.

Computing Machine Architecture

Figure 24:
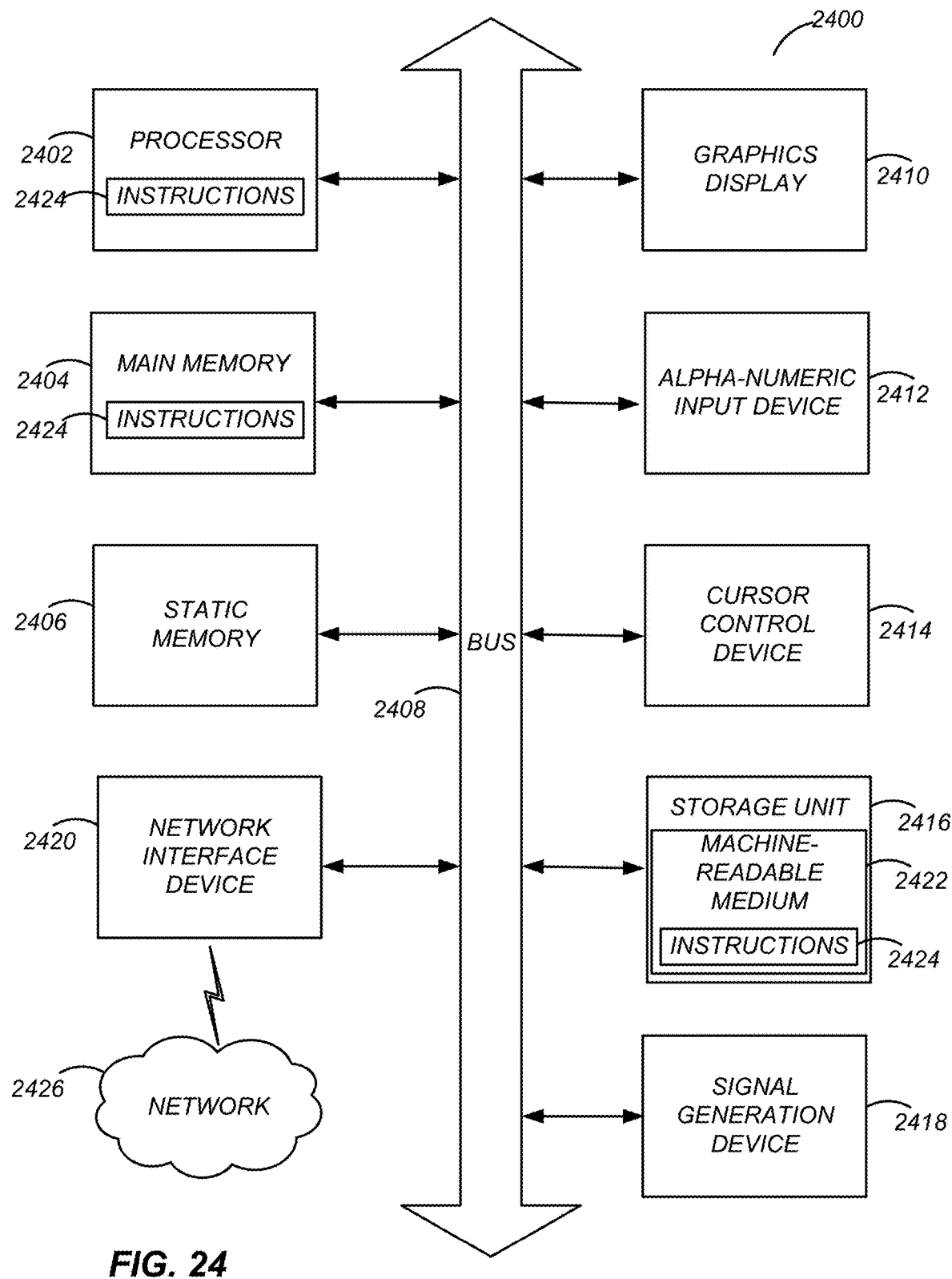
FIG. 24 illustrates an embodiment of a computing machine that can read instructions from a machine-readable medium and execute the instructions in a processor or controller.

FIG. 24 is a block diagram illustrating components of an example machine able to read instructions from a machine-readable medium and execute them in a processor (or controller). Specifically, FIG. 24 shows a diagrammatic representation of a machine in the example form of a computer system 2400 within which instructions 2424 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 2424 (sequential or otherwise) that specify actions to be taken by that machine. Further, while only a single machine is illustrated, the term "machine" shall also be taken to include any collection of machines that individually or jointly execute instructions 2424 to perform any one or more of the methodologies discussed herein.

The example computer system 2400 includes a processor 2402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 2404, and a static memory 2406, which are configured to communicate with each other via a bus 2408. The computer system 2400 may further include graphics display unit 2410 (e.g., a plasma display panel (PDP), a liquid crystal display (LCD), a projector, or a cathode ray tube (CRT)). The computer system 2400 may also include alphanumeric input device 2412 (e.g., a keyboard), a cursor control device 2414 (e.g., a mouse, a trackball, a joystick, a motion sensor, or other pointing instrument), a storage unit 2416, a signal generation device 2418 (e.g., a speaker), and a network interface device 2420, which also are configured to communicate via the bus 2408.

The storage unit 2416 includes a machine-readable medium 2422 on which is stored instructions 2424 (e.g., software) embodying any one or more of the methodologies or functions described herein. The instructions 2424 (e.g., software) may also reside, completely or at least partially, within the main memory 2404 or within the processor 2402 (e.g., within a processor's cache memory) during execution thereof by the computer system 2400, the main memory 2404 and the processor 2402 also constituting machine-readable media. The instructions 2424 (e.g., software) may be transmitted or received over a network 2426 via the network interface device 2420.

While machine-readable medium 2422 is shown in an example embodiment to be a single medium, the term "machine-readable medium" should be taken to include a single medium or multiple media (e.g., a centralized or distributed database, or associated caches and servers) able to store instructions (e.g., instructions 2424). The term "machine-readable medium" shall also be taken to include any medium that is capable of storing instructions (e.g., instructions 2424) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A non-transitory computer readable storage medium storing instructions for performing calibration of sensors of a vehicle, wherein the instructions when executed by a processor, cause the processor to perform steps including:
   receiving, by a lidar mounted on an autonomous vehicle, a lidar scan;
   receiving, by a camera mounted on the autonomous vehicle, a camera image;
   determining a first set of edges based on the lidar scan, the determining of the first set of edges comprising:
      determining a first set of points based on a difference between intensity of each point and an adjacent point;
      determining a second set of points based on a difference between depth of each point and an adjacent point; and
      determining the first set of edges based on the first set of points and the second set of points;
   determining a second set of edges based on the camera image;
   determining a measure of alignment between the first set of edges and the second set of edges based on a first transform;
   determining a second transform based on the first transform, wherein the second transform has a better measure of alignment compared to the first transform;
   generating a high definition map based on the second transform; and
   sending signals to controls of the autonomous vehicle based on the high definition map.

2. The non-transitory computer readable storage medium of claim 1, wherein instructions for determining the first set of points cause the processors to perform the steps of:

for each of a set of points of the lidar scan, determining an edge score for the point, the edge score value directly related to a difference in intensity of the point and an intensity of an adjacent point; and selecting a subset of points having an edge score above a threshold.

3. The non-transitory computer readable storage medium of claim 2, wherein instructions for determining the second set of points cause the processors to perform the steps of:

for each of a set of points of the lidar scan, determining an edge score for the point, the edge score value directly related to a difference in depth of the point and a depth of an adjacent point; and selecting a subset of points having an edge score value above the threshold.

4. The non-transitory computer readable storage medium of claim 3, wherein instructions for determining the first set of edges based on the lidar scan cause the processors to perform the steps of:

determining a first aggregate measure of intensity based on the first set of points;

determining a second aggregate measure of depth based on the first set of points; and scaling edge scores of at least one of the first set of points or the second set of points based on the first aggregate measure and the second aggregate measure.

5. The non-transitory computer readable storage medium of claim 1, wherein instructions for selecting the first set of points cause the processors to perform the steps of:

identifying a set of points from a region of a point cloud corresponding to lidar scan on the ground; and selecting the first set of points from the identified set of points.

6. The non-transitory computer readable storage medium of claim 1, wherein instructions for selecting the second set of points cause the processors to perform the steps of:

identifying a set of points as belonging to a region of a point cloud corresponding to lidar scan above the ground; and selecting the second set of points from the identified set of points.

7. The non-transitory computer readable storage medium of claim 1, wherein instructions for selecting the second set of points cause the processors to perform the steps of:

selecting a set of points from the lidar scan as points on ground responsive to the points being close to an edge of the lidar scan, wherein the edge of the lidar scan is determined to be closest to the ground;

determining a ground plane passing through the selected set of points; and selecting the first set of points and the second set of points based on the ground plane.

8. The non-transitory computer readable storage medium of claim 1, wherein determining the second transform based on the first transform, is performed repeatedly, wherein the instructions further cause the processor to perform the steps of, for an iteration:

initializing the first transform as the second transform of the previous iteration; and determining the second transform based on the first transform.

9. The non-transitory computer readable storage medium of claim 1, wherein each of the first transform and the second transform comprises a plurality of transform parameters, wherein determining the second transform based on the first transform comprises, performing a search for a transform having a lowest alignment score, wherein an alignment score measures a degree of alignment between the first set of edges and the second set of edges, wherein the instructions further cause the processor to perform the steps of:

determining an upper bound and a lower bound for each transform parameter; and determining an alignment score for each of a plurality of points selected from a region within the upper bound and the lower bound of each transform parameters; and selecting the second transform based on the alignment score.

10. The non-transitory computer readable storage medium of claim 9, wherein instructions for determining the upper bound and the lower bound for a particular transform parameter cause the processors to perform the steps of:

determining one or more measures of variation in values of the transform parameter based on past iterations for calibrating the sensors; and selecting the upper bound and the lower bound based on the one or more measures of variation.

11. A method for performing calibration of sensors of a vehicle, the method comprising:

receiving, by a lidar mounted on an autonomous vehicle, a lidar scan;

receiving, by a camera mounted on the autonomous vehicle, a camera image;

determining a first set of edges based on the lidar scan, the determining of the first set of edges comprising:

determining a first set of points based on a difference between intensity of each point and an adjacent point;

determining a second set of points based on a difference between depth of each point and an adjacent point; and determining the first set of edges based on the first set of points and the second set of points;

determining a second set of edges based on the camera image;

determining a measure of alignment between the first set of edges and the second set of edges based on a first transform;

determining a second transform based on the first transform, wherein the second transform has a better measure of alignment compared to the first transform;

generating a high definition map based on the second transform; and sending signals to controls of the autonomous vehicle based on the high definition map.

12. The method of claim 11, wherein determining the first set of points comprises:

for each of a set of points of the lidar scan, determining an edge score for the point, the edge score value directly related to a difference in intensity of the point and an intensity of an adjacent point; and selecting a subset of points having an edge score above a threshold.

13. The method of claim 12, wherein determining the second set of points comprises:

for each of a set of points of the lidar scan, determining an edge score for the point, the edge score value directly related to a difference in depth of the point and a depth of an adjacent point; and selecting a subset of points having an edge score value above the threshold.

14. The method of claim 13, wherein determining the first set of edges based on the lidar scan, further comprises:

determining a first aggregate measure of intensity based on the first set of points;

determining a second aggregate measure of depth based on the first set of points; and scaling edge scores of at least one of the first set of points or the second set of points based on the first aggregate measure and the second aggregate measure.

15. The method of claim 11, wherein selecting the first set of points comprises:

identifying a set of points from a region of a point cloud corresponding to lidar scan on the ground; and selecting the first set of points from the identified set of points.

16. The method of claim 11, wherein selecting the second set of points comprises:

identifying a set of points as belonging to a region of a point cloud corresponding to lidar scan above the ground; and selecting the second set of points from the identified set of points.

17. The method of claim 11, wherein selecting the second set of points comprises:

selecting a set of points from the lidar scan as points on ground responsive to the points being close to an edge of the lidar scan, wherein the edge of the lidar scan is determined to be closest to the ground;

determining a ground plane passing through the selected set of points; and selecting the first set of points and the second set of points based on the ground plane.

18. The method of claim 11, wherein determining the second transform based on the first transform, is performed repeatedly, the method comprising, for an iteration:

initializing the first transform as the second transform of the previous iteration; and determining the second transform based on the first transform.

19. The method of claim 11, wherein each of the first transform and the second transform comprises a plurality of transform parameters, wherein determining the second transform based on the first transform comprises, performing a search for a transform having a lowest alignment score, wherein an alignment score measures a degree of alignment between the first set of edges and the second set of edges:

determining an upper bound and a lower bound for each transform parameter; and determining an alignment score for each of a plurality of points selected from a region within the upper bound and the lower bound of each transform parameters; and selecting the second transform based on the alignment score.

20. A computer system comprising:

one or more processors; and a non-transitory computer readable storage medium storing instructions for performing calibration of sensors of a vehicle, wherein the instructions when executed by a processor, cause the processor to perform steps including:

receiving, by a lidar mounted on an autonomous vehicle, a lidar scan;

receiving, by a camera mounted on the autonomous vehicle, a camera image;

determining a first set of edges based on the lidar scan, the determining of the first set of edges comprising:

determining a first set of points based on a difference between intensity of each point and an adjacent point;

determining a second set of points based on a difference between depth of each point and an adjacent point; and determining the first set of edges based on the first set of points and the second set of points;

determining a second set of edges based on the camera image;

determining a measure of alignment between the first set of edges and the second set of edges based on a first transform;

determining a second transform based on the first transform, wherein the second transform has a better measure of alignment compared to the first transform;

generating a high definition map based on the second transform; and sending signals to controls of the autonomous vehicle based on the high definition map.

* * * * *